US008801520B2

(12) United States Patent
Lafky et al.

(10) Patent No.: US 8,801,520 B2
(45) Date of Patent: *Aug. 12, 2014

(54) GAMING METHOD AND DEVICE INVOLVING PROGRESSIVE WAGERS

(71) Applicant: IGT, Reno, NV (US)

(72) Inventors: Ernie M. Lafky, San Francisco, CA (US); Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,746

(22) Filed: Mar. 11, 2013

(65) Prior Publication Data

US 2013/0196740 A1 Aug. 1, 2013

Related U.S. Application Data

(60) Continuation of application No. 12/684,355, filed on Jan. 8, 2010, now Pat. No. 8,408,993, which is a division of application No. 11/196,645, filed on Aug. 2, 2005, now Pat. No. 7,666,093.

(60) Provisional application No. 60/598,305, filed on Aug. 3, 2004.

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.

CPC ............ *G07F 17/32* (2013.01); *G07F 17/3267* (2013.01)

USPC .................. 463/27; 463/16; 463/20; 463/21; 463/22; 463/25; 463/26; 463/42; 273/138.1; 273/138.2; 273/143 R

(58) Field of Classification Search

USPC ................ 463/16, 20, 21, 22, 25, 26, 27, 42; 273/138.1, 138.2, 143 R

See application file for complete search history.

(56) References Cited

U.S. PATENT DOCUMENTS

| | | | |
|---|---|---|---|
| 1,978,395 | A | 10/1934 | Groetchen |
| 2,545,644 | A | 3/1951 | Benton et al. |

(Continued)

FOREIGN PATENT DOCUMENTS

| | | |
|---|---|---|
| AU | 524709 | 9/1982 |
| AU | 555905 | 10/1986 |

(Continued)

OTHER PUBLICATIONS

4DU Dice Unit Advertisement written by starpoint.uk.com, printed on Sep. 3, 2002.

(Continued)

*Primary Examiner* — William Brewster
*Assistant Examiner* — Ryan Hsu
(74) *Attorney, Agent, or Firm* — Neal, Gerber & Eisenberg LLP

(57) ABSTRACT

A method of gaming is disclosed wherein progressive award values may be increased in response to certain pre-established game outcomes, wager amounts or random events. The increased progressive award values may be based on a primary game or secondary game outcome. Another innovation is the resetting of progressive awards upon completion of a bonus event whether or not award actually won in said bonus event. Player tracking systems permit progressive award values to be linked to a particular player such that the progressive award values remain personal to the player. Re-setting increased progressive award values is also disclosed.

26 Claims, 14 Drawing Sheets

(56) References Cited

U.S. PATENT DOCUMENTS

| | | | |
|---|---|---|---|
| 2,743,108 | A | 4/1956 | Sanders |
| 2,942,574 | A | 6/1960 | Golay |
| 3,420,525 | A | 1/1969 | Waders |
| 3,618,019 | A | 11/1971 | Nemirovsky et al. |
| 3,642,287 | A | 2/1972 | Lally et al. |
| 3,735,987 | A | 5/1973 | Ohki |
| 3,904,207 | A | 9/1975 | Gold |
| 3,971,557 | A | 7/1976 | Breslow et al. |
| 3,975,022 | A | 8/1976 | Figueroa |
| 3,998,309 | A | 12/1976 | Mandas et al. |
| 4,072,930 | A | 2/1978 | Lucero et al. |
| 4,182,515 | A | 1/1980 | Nemeth |
| 4,198,052 | A | 4/1980 | Gauselmann |
| 4,238,127 | A | 12/1980 | Lucero et al. |
| 4,277,064 | A | 7/1981 | Newman |
| 4,283,709 | A | 8/1981 | Lucero et al. |
| 4,335,809 | A | 6/1982 | Wain |
| 4,363,485 | A | 12/1982 | Edwall |
| 4,409,656 | A | 10/1983 | Andersen et al. |
| 4,410,178 | A | 10/1983 | Partridge |
| 4,448,419 | A | 5/1984 | Telnaes |
| 4,494,197 | A | 1/1985 | Troy et al. |
| 4,560,161 | A | 12/1985 | Hamano |
| 4,573,681 | A | 3/1986 | Okada |
| 4,582,324 | A | 4/1986 | Koza et al. |
| 4,618,150 | A | 10/1986 | Kimura |
| 4,621,814 | A | 11/1986 | Stepan et al. |
| 4,624,459 | A | 11/1986 | Kaufman |
| 4,636,951 | A | 1/1987 | Harlick |
| 4,652,998 | A | 3/1987 | Koza et al. |
| 4,669,731 | A | 6/1987 | Clarke |
| 4,695,053 | A | 9/1987 | Vazquez, Jr. et al. |
| 4,721,307 | A | 1/1988 | Okada |
| 4,732,386 | A | 3/1988 | Rayfiel |
| 4,743,024 | A | 5/1988 | Helm et al. |
| 4,756,531 | A | 7/1988 | DiRe et al. |
| 4,760,527 | A | 7/1988 | Sidley |
| 4,775,155 | A | 10/1988 | Lees |
| 4,805,907 | A | 2/1989 | Hagiwara |
| 4,836,546 | A | 6/1989 | DiRe et al. |
| 4,837,728 | A | 6/1989 | Barrie et al. |
| 4,838,552 | A | 6/1989 | Hagiwara |
| 4,842,278 | A | 6/1989 | Markowicz |
| 4,844,464 | A | 7/1989 | Berge |
| 4,856,787 | A | 8/1989 | Itkis |
| 4,861,041 | A | 8/1989 | Jones et al. |
| 4,871,171 | A | 10/1989 | Rivero |
| 4,880,237 | A | 11/1989 | Kishishita |
| 4,926,327 | A | 5/1990 | Sidley |
| 4,948,134 | A | 8/1990 | Suttle et al. |
| 4,964,638 | A | 10/1990 | Ishida |
| 4,991,848 | A | 2/1991 | Greenwood et al. |
| 5,019,973 | A | 5/1991 | Wilcox et al. |
| 5,033,744 | A | 7/1991 | Bridgeman et al. |
| 5,038,022 | A | 8/1991 | Lucero |
| 5,046,737 | A | 9/1991 | Fienberg |
| 5,048,833 | A | 9/1991 | Lamle |
| 5,058,893 | A | 10/1991 | Bertram et al. |
| 5,074,559 | A | 12/1991 | Okada |
| 5,092,598 | A | 3/1992 | Kamille |
| 5,116,055 | A | 5/1992 | Tracy |
| 5,123,649 | A | 6/1992 | Tiberio |
| 5,127,651 | A | 7/1992 | Okada |
| 5,152,529 | A | 10/1992 | Okada |
| 5,158,293 | A | 10/1992 | Mullins |
| 5,178,390 | A | 1/1993 | Okada |
| 5,205,555 | A | 4/1993 | Hamano |
| 5,209,479 | A | 5/1993 | Nagao et al. |
| 5,217,224 | A | 6/1993 | Sincock |
| 5,249,800 | A | 10/1993 | Hilgendorf et al. |
| 5,252,620 | A | 10/1993 | Elliott, Jr. et al. |
| 5,259,616 | A | 11/1993 | Bergmann |
| 5,265,874 | A | 11/1993 | Dickinson et al. |
| 5,275,400 | A | 1/1994 | Weingardt et al. |
| 5,276,312 | A | 1/1994 | McCarthy |
| 5,277,424 | A | 1/1994 | Wilms |
| 5,280,909 | A | 1/1994 | Tracy |
| 5,282,620 | A | 2/1994 | Keesee |
| 5,286,023 | A | 2/1994 | Wood |
| 5,292,127 | A | 3/1994 | Kelly et al. |
| 5,308,065 | A | 5/1994 | Bridgeman et al. |
| 5,321,241 | A | 6/1994 | Craine |
| 5,324,035 | A | 6/1994 | Morris et al. |
| 5,326,104 | A | 7/1994 | Pease et al. |
| 5,332,228 | A | 7/1994 | Schultz |
| 5,342,047 | A | 8/1994 | Heidel et al. |
| 5,342,049 | A | 8/1994 | Wichinsky et al. |
| 5,344,144 | A | 9/1994 | Canon |
| 5,351,970 | A | 10/1994 | Fioretti |
| 5,364,100 | A | 11/1994 | Ludlow et al. |
| 5,377,993 | A | 1/1995 | Josephs |
| 5,380,007 | A | 1/1995 | Travis et al. |
| 5,393,057 | A | 2/1995 | Marnell, II |
| 5,393,061 | A | 2/1995 | Manship et al. |
| 5,395,111 | A | 3/1995 | Inoue |
| 5,398,932 | A | 3/1995 | Eberhardt et al. |
| 5,401,024 | A | 3/1995 | Simunek |
| 5,407,200 | A | 4/1995 | Zalabak |
| 5,411,271 | A | 5/1995 | Mirando |
| 5,417,430 | A | 5/1995 | Breeding |
| 5,423,539 | A | 6/1995 | Nagao |
| 5,429,361 | A | 7/1995 | Raven et al. |
| 5,431,408 | A | 7/1995 | Adams |
| 5,449,173 | A | 9/1995 | Thomas et al. |
| 5,456,465 | A | 10/1995 | Durham |
| 5,470,079 | A | 11/1995 | LeStrange et al. |
| 5,472,194 | A | 12/1995 | Breeding et al. |
| 5,476,259 | A | 12/1995 | Weingardt |
| 5,489,101 | A | 2/1996 | Moody |
| 5,511,781 | A | 4/1996 | Wood |
| 5,524,888 | A | 6/1996 | Heidel |
| 5,531,441 | A | 7/1996 | Dabrowski et al. |
| 5,536,016 | A | 7/1996 | Thompson |
| 5,542,669 | A | 8/1996 | Charron et al. |
| 5,544,892 | A | 8/1996 | Breeding |
| 5,544,893 | A | 8/1996 | Jones et al. |
| 5,547,192 | A | 8/1996 | Ishibashi |
| 5,560,603 | A | 10/1996 | Seelig et al. |
| 5,564,700 | A | 10/1996 | Celona |
| 5,566,337 | A | 10/1996 | Szymanski |
| 5,570,885 | A | 11/1996 | Ornstein |
| 5,577,959 | A | 11/1996 | Takemoto |
| 5,580,053 | A | 12/1996 | Crouch |
| 5,580,309 | A | 12/1996 | Piechowiak et al. |
| 5,584,485 | A | 12/1996 | Jones et al. |
| 5,584,763 | A | 12/1996 | Kelly et al. |
| 5,584,764 | A | 12/1996 | Inoue |
| 5,601,487 | A | 2/1997 | Oshima et al. |
| 5,605,506 | A | 2/1997 | Hoorn et al. |
| 5,609,524 | A | 3/1997 | Inoue |
| 5,611,535 | A | 3/1997 | Tiberio |
| 5,611,730 | A | 3/1997 | Weiss |
| 5,622,366 | A | 4/1997 | Inoue |
| 5,626,341 | A | 5/1997 | Jones |
| 5,630,753 | A | 5/1997 | Fuchs |
| 5,639,089 | A | 6/1997 | Matsumoto et al. |
| 5,641,050 | A | 6/1997 | Smith et al. |
| 5,641,730 | A | 6/1997 | Brown |
| 5,645,486 | A | 7/1997 | Nagao et al. |
| 5,647,592 | A | 7/1997 | Gerow |
| 5,647,798 | A | 7/1997 | Falciglia |
| 5,655,961 | A | 8/1997 | Acres et al. |
| 5,664,998 | A | 9/1997 | Seelig et al. |
| 5,674,128 | A | 10/1997 | Holch et al. |
| 5,702,304 | A | 12/1997 | Acres et al. |
| 5,707,285 | A | 1/1998 | Place et al. |
| 5,707,286 | A | 1/1998 | Carlson |
| 5,711,525 | A | 1/1998 | Breeding |
| 5,720,483 | A | 2/1998 | Trinh |
| 5,722,891 | A | 3/1998 | Inoue |
| 5,732,948 | A | 3/1998 | Yoseloff |
| 5,741,183 | A | 4/1998 | Acres et al. |
| 5,743,523 | A | 4/1998 | Kelly et al. |
| 5,743,524 | A | 4/1998 | Nannicola |

(56) References Cited

U.S. PATENT DOCUMENTS

| | | | |
|---|---|---|---|
| 5,743,526 | A | 4/1998 | Inoue |
| 5,743,800 | A | 4/1998 | Huard et al. |
| 5,752,881 | A | 5/1998 | Inoue |
| 5,752,882 | A | 5/1998 | Acres et al. |
| 5,755,619 | A | 5/1998 | Matsumoto et al. |
| 5,761,647 | A | 6/1998 | Boushy |
| 5,762,552 | A | 6/1998 | Vuong et al. |
| 5,766,076 | A | 6/1998 | Pease et al. |
| 5,769,716 | A | 6/1998 | Saffari et al. |
| 5,772,506 | A | 6/1998 | Marks et al. |
| 5,772,509 | A | 6/1998 | Weiss |
| 5,772,511 | A | 6/1998 | Smeltzer |
| RE35,864 | E | 7/1998 | Weingardt |
| 5,775,692 | A | 7/1998 | Watts et al. |
| 5,779,544 | A | 7/1998 | Seelig et al. |
| 5,779,545 | A | 7/1998 | Berg et al. |
| 5,779,547 | A | 7/1998 | SoRelle et al. |
| 5,779,549 | A | 7/1998 | Walker et al. |
| 5,788,573 | A | 8/1998 | Baerlocher et al. |
| 5,800,269 | A | 9/1998 | Holch et al. |
| 5,806,855 | A | 9/1998 | Cherry |
| 5,807,172 | A | 9/1998 | Piechowiak |
| 5,816,918 | A | 10/1998 | Kelly et al. |
| 5,820,459 | A | 10/1998 | Acres et al. |
| 5,823,872 | A | 10/1998 | Prather et al. |
| 5,823,873 | A | 10/1998 | Moody |
| 5,823,874 | A | 10/1998 | Adams |
| D400,597 | S | 11/1998 | Hedrick et al. |
| 5,833,536 | A | 11/1998 | Davids et al. |
| 5,833,537 | A | 11/1998 | Barrie |
| 5,833,538 | A | 11/1998 | Weiss |
| 5,833,540 | A | 11/1998 | Miodunski et al. |
| 5,836,817 | A | 11/1998 | Acres et al. |
| D402,702 | S | 12/1998 | Seelig et al. |
| 5,848,932 | A | 12/1998 | Adams |
| 5,851,011 | A | 12/1998 | Lott |
| 5,851,147 | A | 12/1998 | Stupak |
| 5,851,149 | A | 12/1998 | Xidos et al. |
| 5,855,514 | A | 1/1999 | Kamille |
| 5,855,515 | A | 1/1999 | Pease et al. |
| 5,863,249 | A | 1/1999 | Inoue |
| 5,873,781 | A | 2/1999 | Keane |
| D406,865 | S | 3/1999 | Heidel |
| 5,876,284 | A | 3/1999 | Acres et al. |
| 5,882,261 | A | 3/1999 | Adams |
| 5,885,157 | A | 3/1999 | Harada et al. |
| 5,885,158 | A | 3/1999 | Torango et al. |
| 5,890,962 | A | 4/1999 | Takemoto |
| 5,893,718 | A | 4/1999 | O'Donnell |
| 5,902,184 | A | 5/1999 | Bennett |
| 5,902,983 | A | 5/1999 | Crevelt et al. |
| 5,910,048 | A | 6/1999 | Feinberg |
| 5,911,418 | A | 6/1999 | Adams et al. |
| 5,919,088 | A | 7/1999 | Weiss |
| 5,927,714 | A | 7/1999 | Kaplan |
| 5,934,672 | A | 8/1999 | Sines et al. |
| 5,935,002 | A | 8/1999 | Falciglia |
| 5,941,773 | A | 8/1999 | Harlick |
| 5,944,606 | A | 8/1999 | Gerow |
| 5,947,820 | A | 9/1999 | Morro et al. |
| 5,947,822 | A | 9/1999 | Weiss |
| 5,951,011 | A | 9/1999 | Potter et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,976,015 | A | 11/1999 | Seelig et al. |
| 5,976,016 | A | 11/1999 | Moody et al. |
| 5,980,384 | A | 11/1999 | Barrie |
| 5,984,779 | A | 11/1999 | Bridgeman et al. |
| 5,984,781 | A | 11/1999 | Sunaga |
| 5,984,782 | A | 11/1999 | Inoue |
| 5,989,121 | A | 11/1999 | Sakamoto |
| 5,993,316 | A | 11/1999 | Coyle et al. |
| 5,997,400 | A | 12/1999 | Seelig et al. |
| 5,997,401 | A | 12/1999 | Crawford |
| 6,001,016 | A | 12/1999 | Walker et al. |
| 6,003,013 | A | 12/1999 | Boushy et al. |
| 6,004,207 | A | 12/1999 | Wilson, Jr. et al. |
| 6,007,066 | A | 12/1999 | Moody |
| 6,007,427 | A | 12/1999 | Wiener |
| 6,012,982 | A | 1/2000 | Piechowiak et al. |
| 6,015,346 | A | 1/2000 | Bennett |
| 6,016,338 | A | 1/2000 | Bansal et al. |
| 6,019,369 | A | 2/2000 | Nakagawa et al. |
| 6,032,955 | A | 3/2000 | Luciano et al. |
| 6,033,307 | A | 3/2000 | Vancura |
| 6,039,648 | A | 3/2000 | Guinn et al. |
| 6,039,649 | A | 3/2000 | Schulze |
| 6,045,129 | A | 4/2000 | Cooper et al. |
| 6,047,963 | A | 4/2000 | Pierce et al. |
| 6,048,269 | A | 4/2000 | Burns et al. |
| 6,050,895 | A | 4/2000 | Luciano et al. |
| 6,056,642 | A | 5/2000 | Bennett |
| 6,059,289 | A | 5/2000 | Vancura |
| 6,059,658 | A | 5/2000 | Mangano et al. |
| 6,062,979 | A | 5/2000 | Inoue |
| 6,062,980 | A | 5/2000 | Luciano |
| 6,062,981 | A | 5/2000 | Luciano, Jr. |
| 6,068,553 | A | 5/2000 | Parker |
| 6,077,162 | A | 6/2000 | Weiss |
| 6,080,062 | A | 6/2000 | Olson |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams |
| 6,089,980 | A | 7/2000 | Gauselmann |
| 6,093,102 | A | 7/2000 | Bennett |
| 6,099,408 | A | 8/2000 | Schneier et al. |
| 6,102,400 | A | 8/2000 | Scott et al. |
| 6,102,474 | A | 8/2000 | Daley |
| 6,102,798 | A | 8/2000 | Bennett |
| 6,102,799 | A | 8/2000 | Stupak |
| 6,105,962 | A | 8/2000 | Malavazos et al. |
| 6,110,039 | A | 8/2000 | Oh |
| 6,110,041 | A | 8/2000 | Walker et al. |
| 6,110,043 | A | 8/2000 | Olsen |
| 6,113,098 | A | 9/2000 | Adams |
| 6,117,009 | A | 9/2000 | Yoseloff |
| 6,117,013 | A | 9/2000 | Eiba |
| 6,120,031 | A | 9/2000 | Adams |
| 6,120,377 | A | 9/2000 | McGinnis, Sr. et al. |
| 6,120,378 | A | 9/2000 | Moody et al. |
| 6,126,541 | A | 10/2000 | Fuchs |
| 6,126,542 | A | 10/2000 | Fier |
| 6,129,355 | A | 10/2000 | Hahn et al. |
| 6,135,884 | A | 10/2000 | Hedrick et al. |
| 6,135,885 | A | 10/2000 | Lermusiaux |
| 6,139,013 | A | 10/2000 | Pierce et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,157 | A | 11/2000 | Suan |
| 6,149,521 | A | 11/2000 | Sanduski |
| 6,152,823 | A | 11/2000 | Lacoste et al. |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,162,122 | A | 12/2000 | Acres et al. |
| 6,165,070 | A | 12/2000 | Nolte et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,183,366 | B1 | 2/2001 | Goldberg et al. |
| 6,186,894 | B1 | 2/2001 | Mayeroff |
| 6,190,254 | B1 | 2/2001 | Bennett |

(56) References Cited

U.S. PATENT DOCUMENTS 6,190,255 B1 2/2001 Thomas et al.
6,193,606 B1 2/2001 Walker et al.
6,203,010 B1 3/2001 Jorasch et al.
6,203,429 B1 3/2001 Demar et al.
6,203,430 B1 3/2001 Walker et al.
6,206,374 B1 3/2001 Jones
6,206,782 B1 3/2001 Walker et al.
D441,031 S 4/2001 Seelig et al.
6,210,275 B1 4/2001 Olsen
6,210,277 B1 4/2001 Stefan
6,210,279 B1 4/2001 Dickinson
6,213,876 B1 4/2001 Moore, Jr.
6,217,448 B1 4/2001 Olsen
6,220,593 B1 4/2001 Pierce et al.
6,220,959 B1 4/2001 Holmes, Jr. et al.
6,220,961 B1 4/2001 Keane et al.
6,224,482 B1 5/2001 Bennett
6,224,483 B1 5/2001 Mayeroff
6,224,484 B1 5/2001 Okuda et al.
6,227,970 B1 5/2001 Shimizu et al.
6,227,971 B1 5/2001 Weiss
6,231,442 B1 5/2001 Mayeroff
6,231,445 B1 5/2001 Acres
6,234,879 B1 5/2001 Hasegawa et al.
6,234,897 B1 5/2001 Frohm et al.
6,238,287 B1 5/2001 Komori et al.
6,238,288 B1 5/2001 Walker et al.
D443,313 S 6/2001 Brettschneider
6,241,608 B1 6/2001 Torango
6,244,958 B1 6/2001 Acres
6,251,013 B1 6/2001 Bennett
6,254,481 B1 7/2001 Jaffe
6,254,483 B1 7/2001 Acres
6,257,981 B1 7/2001 Acres et al.
6,261,128 B1 7/2001 Heim et al.
6,261,177 B1 7/2001 Bennett
6,264,557 B1 7/2001 Schneier et al.
6,267,669 B1 7/2001 Luciano, Jr. et al.
6,270,409 B1 8/2001 Shuster
6,270,411 B1 8/2001 Gura et al.
6,270,412 B1 8/2001 Crawford et al.
6,287,202 B1 9/2001 Pascal et al.
6,293,864 B1 9/2001 Romero
6,293,866 B1 9/2001 Walker et al.
RE37,414 E 10/2001 Harlick
6,299,165 B1 10/2001 Nagano
6,299,170 B1 10/2001 Yoseloff
6,302,398 B1 10/2001 Vecchio
6,302,790 B1 10/2001 Brossard
6,302,793 B1 10/2001 Fertitta, III et al.
6,305,686 B1 10/2001 Perrie et al.
6,309,298 B1 10/2001 Gerow
6,309,299 B1 10/2001 Weiss
6,309,300 B1 10/2001 Glavich
6,311,976 B1 11/2001 Yoseloff et al.
6,312,330 B1 11/2001 Jones et al.
6,312,332 B1 11/2001 Walker et al.
6,312,333 B1 11/2001 Acres
6,312,334 B1 11/2001 Yoseloff
6,315,660 B1 11/2001 DeMar et al.
6,315,662 B1 11/2001 Jorasch et al.
6,315,663 B1 11/2001 Sakamoto
6,315,664 B1 11/2001 Baerlocher et al.
6,319,122 B1 11/2001 Packes, Jr. et al.
6,319,123 B1 11/2001 Paludi
6,319,124 B1 11/2001 Baerlocher et al.
6,319,125 B1 11/2001 Acres
6,319,127 B1 11/2001 Walker et al.
6,322,078 B1 11/2001 Adams
6,322,309 B1 11/2001 Thomas et al.
6,328,649 B1 12/2001 Randall et al.
6,334,814 B1 1/2002 Adams
6,336,857 B1 1/2002 McBride
6,336,859 B2 1/2002 Jones et al.
6,336,860 B1 1/2002 Webb
6,336,862 B1 1/2002 Byrne
6,336,863 B1 1/2002 Baerlocher et al.
6,338,678 B1 1/2002 Seelig et al.
6,340,158 B2 1/2002 Pierce et al.
6,343,989 B1 2/2002 Wood et al.
6,345,824 B1 2/2002 Selitzky
6,346,043 B1 2/2002 Colin et al.
6,347,738 B1 2/2002 Crevelt et al.
6,347,996 B1 2/2002 Gilmore et al.
6,358,144 B1 3/2002 Kadlic et al.
6,358,149 B1 3/2002 Schneider et al.
6,361,441 B1 3/2002 Walker et al.
6,364,766 B1 4/2002 Anderson et al.
6,364,767 B1 4/2002 Brossard et al.
6,364,768 B1 4/2002 Acres et al.
6,364,769 B1 4/2002 Weiss et al.
6,368,216 B1 4/2002 Hedrick et al.
6,368,218 B2 4/2002 Angell, Jr.
6,371,852 B1 4/2002 Acres
6,375,187 B1 4/2002 Baerlocher et al.
6,375,567 B1 4/2002 Acres
6,375,568 B1 4/2002 Roffman et al.
6,375,569 B1 4/2002 Acres
6,375,570 B1 4/2002 Poole
6,386,974 B1 5/2002 Adams
6,386,977 B1 5/2002 Hole
6,398,218 B1 6/2002 Vancura
6,398,220 B1 6/2002 Inoue
6,398,644 B1 6/2002 Perrie et al.
6,398,645 B1 6/2002 Yoseloff
6,406,369 B1 6/2002 Baerlocher et al.
6,413,160 B1 7/2002 Vancura
6,416,408 B2 7/2002 Tracy et al.
6,416,409 B1 7/2002 Jordan
6,419,579 B1 7/2002 Bennett
6,419,583 B1 7/2002 Crumby et al.
6,428,412 B1 8/2002 Anderson et al.
6,431,983 B2 8/2002 Acres
6,435,500 B2 8/2002 Gumina
6,435,511 B1 8/2002 Vancura et al.
6,435,968 B1 8/2002 Torango
6,439,993 B1 8/2002 O'Halloran
6,439,995 B1 8/2002 Hughs-Baird et al.
6,443,452 B1 9/2002 Brune
6,443,837 B1 9/2002 Jaffe et al.
6,450,884 B1 9/2002 Seelig et al.
6,454,266 B1 9/2002 Breeding et al.
6,454,651 B1 9/2002 Yoseloff
RE37,885 E 10/2002 Acres et al.
6,461,241 B1 10/2002 Webb et al.
6,464,582 B1 10/2002 Baerlocher et al.
6,471,208 B2 10/2002 Yoseloff et al.
6,471,591 B1 10/2002 Crumby
D465,531 S 11/2002 Luciano, Jr. et al.
6,481,713 B2 11/2002 Perrie et al.
6,482,089 B2 11/2002 Demar et al.
6,491,584 B2 12/2002 Graham et al.
6,494,454 B2 12/2002 Adams
6,506,117 B2 1/2003 DeMar et al.
6,506,118 B1 1/2003 Baerlocher et al.
6,508,707 B2 1/2003 DeMar et al.
6,511,375 B1 1/2003 Kaminkow
6,511,376 B2 1/2003 Walker et al.
6,514,141 B1 2/2003 Kaminkow et al.
6,517,433 B2 2/2003 Loose et al.
6,520,855 B2 2/2003 DeMar et al.
6,533,273 B2 3/2003 Cole et al.
6,533,658 B1 3/2003 Walker et al.
6,533,660 B2 3/2003 Seelig et al.
6,533,664 B1 3/2003 Crumby
6,537,150 B1 3/2003 Luciano et al.
6,537,152 B2 3/2003 Seelig et al.
6,546,134 B1 4/2003 Shrairman et al.
6,546,374 B1 4/2003 Esposito et al.
6,547,131 B1 4/2003 Foodman et al.
6,547,242 B1 4/2003 Sugiyama et al.
6,554,283 B2 4/2003 Vancura et al.
6,554,705 B1 4/2003 Cumbers
6,561,904 B2 5/2003 Locke et al.

(56) References Cited

U.S. PATENT DOCUMENTS 6,565,434 B1 5/2003 Acres
6,565,436 B1 5/2003 Baerlocher
6,569,015 B1 5/2003 Baerlocher et al.
6,572,471 B1 6/2003 Bennett
6,575,830 B2 6/2003 Baerlocher et al.
6,575,832 B1 6/2003 Manfredi et al.
6,577,733 B1 6/2003 Charrin
6,582,307 B2 6/2003 Webb
6,589,115 B2 7/2003 Walker et al.
6,592,458 B1 7/2003 Ho
6,592,460 B2 7/2003 Torango
6,595,853 B1 7/2003 Osawa
6,595,854 B2 7/2003 Hughs-Baird et al.
6,599,185 B1 7/2003 Kaminkow et al.
6,599,186 B1 7/2003 Walker et al.
6,599,188 B2 7/2003 Hirsch et al.
6,599,190 B2 7/2003 Osawa
6,599,193 B2 7/2003 Baerlocher et al.
6,601,771 B2 8/2003 Charrin
6,602,135 B1 8/2003 Gerrard
6,602,137 B2 8/2003 Kaminkow et al.
6,604,740 B1 8/2003 Singer et al.
6,607,437 B2 8/2003 Casey et al.
6,607,438 B2 8/2003 Baerlocher et al.
6,607,441 B1 8/2003 Acres
6,609,971 B2 8/2003 Vancura
6,609,972 B2 8/2003 Seelig et al.
6,609,973 B1 8/2003 Weiss
6,616,142 B2 9/2003 Adams
6,616,531 B1 9/2003 Mullins
6,620,046 B2 9/2003 Rowe
6,626,758 B1 9/2003 Parham et al.
6,634,944 B2 10/2003 Osawa
6,637,747 B1 10/2003 Garrod
6,645,073 B2 11/2003 Lemay et al.
6,645,077 B2 11/2003 Rowe
6,648,759 B2 11/2003 Vancura
6,648,762 B2 11/2003 Walker et al.
6,652,378 B2 11/2003 Cannon et al.
6,656,040 B1 12/2003 Brosnan et al.
6,656,043 B2 12/2003 Seelig et al.
6,656,047 B1 12/2003 Tarantino et al.
6,656,048 B2 12/2003 Olsen
6,656,052 B2 12/2003 Abramopoulos et al.
6,659,864 B2 12/2003 McGahn et al.
6,666,765 B2 12/2003 Vancura
6,672,959 B2 1/2004 Moody et al.
6,675,152 B1 1/2004 Prasad et al.
6,676,513 B2 1/2004 Gauselmann
6,682,419 B2 1/2004 Webb et al.
6,682,420 B2 1/2004 Webb et al.
6,688,977 B1 2/2004 Baerlocher et al.
6,692,355 B2 2/2004 Baerlocher et al.
6,712,694 B1 3/2004 Nordman
6,712,695 B2 3/2004 Mothwurf et al.
6,712,697 B2 3/2004 Acres
6,715,756 B2 4/2004 Inoue
6,719,630 B1 4/2004 Seelig et al.
6,726,204 B2 4/2004 Inoue
6,726,563 B1 4/2004 Baerlocher et al.
6,733,390 B2 5/2004 Walker et al.
6,746,328 B2 6/2004 Cannon et al.
6,749,504 B2 6/2004 Hughs-Baird
6,749,510 B2 6/2004 Giobbi
6,754,346 B2 6/2004 Eiserling et al.
6,761,632 B2 7/2004 Bansemer et al.
6,776,714 B2 8/2004 Ungaro et al.
6,776,715 B2 8/2004 Price
6,790,141 B2 9/2004 Muir
6,800,030 B2 10/2004 Acres
6,805,352 B2 10/2004 Hunter
6,811,483 B1 11/2004 Webb et al.
6,832,956 B1 12/2004 Boyd et al.
6,832,958 B2 12/2004 Acres et al.
6,837,788 B2 1/2005 Cannon
6,857,958 B2 2/2005 Osawa
6,866,583 B2 3/2005 Glavich et al.
6,869,361 B2 3/2005 Sharpless et al.
6,884,168 B2 4/2005 Wood et al.
6,887,154 B1 5/2005 Luciano, Jr. et al.
6,889,849 B2 5/2005 Heidel et al.
6,899,625 B2 5/2005 Luciano, Jr. et al.
6,905,406 B2 6/2005 Kaminkow et al.
6,908,387 B2 6/2005 Hedrick et al.
6,910,964 B2 6/2005 Acres
6,913,532 B2 7/2005 Baerlocher et al.
6,918,832 B2 7/2005 Baerlocher et al.
6,918,834 B2 7/2005 Vancura
6,935,951 B2 8/2005 Paulsen et al.
6,935,958 B2 8/2005 Nelson
6,939,234 B2 9/2005 Beatty
6,942,574 B1 9/2005 LeMay et al.
RE38,812 E 10/2005 Acres et al.
6,955,600 B2 10/2005 Glavich et al.
6,966,834 B1 11/2005 Johnson
7,004,466 B2 2/2006 Gauselmann
7,029,395 B1 4/2006 Baerlocher
7,036,012 B2 4/2006 Charrin
7,056,215 B1 6/2006 Olive
7,169,042 B2 1/2007 Muir et al.
7,578,739 B2 8/2009 Gauselmann
7,666,093 B2 2/2010 Lafky et al.
7,780,520 B2 8/2010 Baerlocher
7,959,509 B2 6/2011 Saffari et al.
8,162,666 B2 4/2012 Parham
2001/0024971 A1 9/2001 Brossard
2001/0049303 A1 12/2001 Found
2001/0055990 A1 12/2001 Acres
2002/0002674 A1 1/2002 Grimes et al.
2002/0042296 A1 4/2002 Walker et al.
2002/0045472 A1 4/2002 Adams
2002/0045475 A1 4/2002 Glavich et al.
2002/0071557 A1 6/2002 Nguyen
2002/0094855 A1 7/2002 Berman
2002/0094862 A1 7/2002 Inoue
2002/0116615 A1 8/2002 Nguyen et al.
2002/0138594 A1 9/2002 Rowe
2002/0142822 A1 10/2002 Baerlocher et al.
2002/0142829 A1 10/2002 Inoue
2002/0151345 A1 10/2002 Byrne
2002/0151354 A1 10/2002 Boesen et al.
2002/0152120 A1 10/2002 Howington
2002/0155874 A1 10/2002 Byrne
2002/0155880 A1 10/2002 Glavich et al.
2002/0165023 A1 11/2002 Brosnan et al.
2002/0187834 A1 12/2002 Rowe et al.
2002/0198036 A1 12/2002 Baerlocher et al.
2003/0014370 A1 1/2003 Charrin
2003/0027618 A1 2/2003 Byrne
2003/0027625 A1 2/2003 Rowe
2003/0027630 A1 2/2003 Kelly et al.
2003/0028779 A1 2/2003 Rowe
2003/0036430 A1 2/2003 Cannon
2003/0040355 A1 2/2003 Baerlocher
2003/0040358 A1 2/2003 Rothkranz et al.
2003/0040360 A1 2/2003 Kaminkow
2003/0045337 A1 3/2003 Byrne
2003/0045348 A1 3/2003 Palmer et al.
2003/0045350 A1 3/2003 Baerlocher et al.
2003/0045353 A1 3/2003 Paulsen et al.
2003/0050106 A1 3/2003 Lyfoung
2003/0050111 A1 3/2003 Saffari
2003/0054875 A1 3/2003 Marks et al.
2003/0054878 A1 3/2003 Benoy et al.
2003/0060254 A1 3/2003 Cuddy et al.
2003/0060266 A1 3/2003 Baerlocher
2003/0060267 A1 3/2003 Glavich et al.
2003/0060269 A1 3/2003 Paulsen et al.
2003/0060272 A1 3/2003 Glavich et al.
2003/0060279 A1 3/2003 Torango
2003/0064772 A1 4/2003 Tempest et al.
2003/0064773 A1 4/2003 Baerlocher et al.
2003/0064776 A1 4/2003 Byrne
2003/0064785 A1 4/2003 Stone et al.

(56) References Cited

U.S. PATENT DOCUMENTS

2003/0064790 A1 4/2003 Hughs-Baird et al.
2003/0069056 A1 4/2003 Cormack et al.
2003/0069064 A1 4/2003 Ainsworth
2003/0073482 A1 4/2003 Baerlocher et al.
2003/0078089 A1 4/2003 Gray et al.
2003/0083943 A1 5/2003 Adams et al.
2003/0092484 A1 5/2003 Schneider et al.
2003/0109306 A1 6/2003 Karmarkar
2003/0119583 A1 6/2003 Kaminkow et al.
2003/0144965 A1 7/2003 Prasad et al.
2003/0146574 A1 8/2003 Duhamel
2003/0148808 A1 8/2003 Price
2003/0162584 A1 8/2003 Hughs-Baird et al.
2003/0162585 A1 8/2003 Bigelow et al.
2003/0181231 A1 9/2003 Vancura et al.
2003/0182574 A1 9/2003 Whitten et al.
2003/0186733 A1 10/2003 Wolf et al.
2003/0195027 A1 10/2003 Baerlocher et al.
2003/0199321 A1 10/2003 Williams
2003/0207709 A1 11/2003 Paotrakul
2003/0207710 A1 11/2003 Rodgers et al.
2003/0211879 A1 11/2003 Englman
2003/0211884 A1 11/2003 Gauselmann
2003/0216165 A1 11/2003 Singer et al.
2003/0216166 A1 11/2003 Baerlocher et al.
2003/0222402 A1 12/2003 Olive
2003/0223803 A1 12/2003 De Schrijver
2003/0228899 A1 12/2003 Evans
2003/0228904 A1 12/2003 Acres et al.
2003/0232643 A1 12/2003 Inoue
2003/0232647 A1 12/2003 Moser
2003/0236116 A1 12/2003 Marks et al.
2004/0000754 A1 1/2004 Inoue
2004/0002372 A1 1/2004 Rodgers et al.
2004/0009807 A1 1/2004 Miller et al.
2004/0009808 A1 1/2004 Gauselmann
2004/0009811 A1 1/2004 Torango
2004/0012145 A1 1/2004 Inoue
2004/0014516 A1 1/2004 Inoue
2004/0014517 A1 1/2004 Inoue
2004/0017041 A1 1/2004 Inoue
2004/0018866 A1 1/2004 Inoue
2004/0023716 A1 2/2004 Gauselmann
2004/0026854 A1 2/2004 Inoue
2004/0029631 A1 2/2004 Duhamel
2004/0036218 A1 2/2004 Inoue
2004/0038726 A1 2/2004 Inoue
2004/0038741 A1 2/2004 Gauselmann
2004/0041340 A1 3/2004 Inoue
2004/0048644 A1 3/2004 Gerrard et al.
2004/0048649 A1 3/2004 Peterson et al.
2004/0048652 A1 3/2004 Ching et al.
2004/0053658 A1 3/2004 Rothranz
2004/0053659 A1 3/2004 Rothkranz et al.
2004/0053670 A1 3/2004 Rothkranz et al.
2004/0053671 A1 3/2004 Nordman
2004/0053672 A1 3/2004 Baerlocher
2004/0053673 A1 3/2004 Mishra
2004/0053683 A1 3/2004 Hartl et al.
2004/0053687 A1 3/2004 Nordman
2004/0072615 A1 4/2004 Maya et al.
2004/0072619 A1 4/2004 Brosnan et al.
2004/0087368 A1 5/2004 Gavselmann
2004/0092304 A1 5/2004 George
2004/0121840 A1 6/2004 Rosander et al.
2004/0137982 A1 7/2004 Cuddy et al.
2004/0147306 A1 7/2004 Randall et al.
2004/0150161 A1 8/2004 Inoue
2004/0152509 A1 8/2004 Hornik et al.
2004/0155399 A1 8/2004 Inoue
2004/0157658 A1 8/2004 Rothkranz
2004/0171416 A1 9/2004 Baerlocher et al.
2004/0171420 A1 9/2004 Baerlocher et al.
2004/0180715 A1 9/2004 Nordman
2004/0183251 A1 9/2004 Inoue
2004/0235552 A1 11/2004 Gauselmann
2004/0242297 A1 12/2004 Walker
2005/0003880 A1 1/2005 Englman
2005/0026694 A1 2/2005 Kelly et al.
2005/0032573 A1 2/2005 Acres et al.
2005/0053672 A1 3/2005 West
2005/0054429 A1 3/2005 Baerlocher et al.
2005/0055113 A1 3/2005 Gauselmann
2005/0059467 A1 3/2005 Saffari et al.
2005/0059472 A1 3/2005 Joshi et al.
2005/0064930 A1 3/2005 Jubinville et al.
2005/0070356 A1 3/2005 Mothwurf
2005/0075163 A1 4/2005 Cuddy et al.
2005/0079908 A1 4/2005 Pacey
2005/0079911 A1 4/2005 Nakatsu
2005/0086478 A1 4/2005 Peinado et al.
2005/0090307 A1 4/2005 Walker et al.
2005/0096130 A1 5/2005 Mullins
2005/0101374 A1 5/2005 Acres
2005/0101375 A1 5/2005 Webb et al.
2005/0101384 A1 5/2005 Parham
2005/0119047 A1 6/2005 Olive
2005/0137010 A1 6/2005 Enzminger et al.
2005/0143168 A1 6/2005 Torango
2005/0143169 A1 6/2005 Nguyen et al.
2005/0159211 A1 7/2005 Englman
2005/0163377 A1 7/2005 Walch
2005/0176488 A1 8/2005 Olive
2005/0178716 A1 8/2005 Suri
2005/0192083 A1 9/2005 Iwamoto
2005/0192088 A1 9/2005 Hartman et al.
2005/0192099 A1 9/2005 Nguyen et al.
2005/0197180 A1 9/2005 Kaminkow et al.
2005/0209004 A1 9/2005 Torango
2005/0215313 A1 9/2005 O'Halloran
2005/0227754 A1 10/2005 Kaminkow et al.
2005/0239542 A1 10/2005 Olsen
2005/0267610 A1 12/2005 Shinoda
2005/0282626 A1 12/2005 Manfredi et al.
2006/0003829 A1 1/2006 Thomas
2006/0009285 A1 1/2006 Pryzby et al.
2006/0019737 A1 1/2006 Yang
2006/0025195 A1 2/2006 Pennington et al.
2006/0025201 A1 2/2006 Van Asdale
2006/0025210 A1 2/2006 Johnson
2006/0026604 A1 2/2006 Tan et al.
2006/0030397 A1 2/2006 Chan
2006/0030403 A1 2/2006 Lafky et al.
2006/0035694 A1 2/2006 Fuller
2006/0035706 A1 2/2006 Thomas et al.
2006/0036552 A1 2/2006 Gunyakti et al.
2006/0040732 A1 2/2006 Baerlocher et al.
2006/0040736 A1 2/2006 Baerlocher et al.
2006/0052159 A1 3/2006 Cahill et al.
2006/0052161 A1 3/2006 Soukup et al.
2006/0052162 A1 3/2006 Soukup et al.
2006/0068897 A1 3/2006 Sanford et al.
2006/0073877 A1 4/2006 Rodgers et al.
2006/0073889 A1 4/2006 Edidin et al.
2006/0073897 A1 4/2006 Englman et al.
2006/0116201 A1 6/2006 Gauselmann
2006/0142079 A1 6/2006 Ikehara et al.
2006/0142086 A1 6/2006 Blackburn et al.
2006/0154718 A1 7/2006 Willyard et al.
2006/0178203 A1 8/2006 Hughes et al.
2006/0183535 A1 8/2006 Marks et al.
2006/0183537 A1 8/2006 Dickerson
2006/0183538 A1 8/2006 Michaelson et al.
2006/0281527 A1 12/2006 Dunaevsky et al.
2006/0287077 A1 12/2006 Grav et al.
2007/0026941 A1 2/2007 Block et al.
2007/0060271 A1 3/2007 Cregan et al.
2007/0060319 A1 3/2007 Block et al.
2007/0117610 A1 5/2007 Webb et al.

(56) References Cited

U.S. PATENT DOCUMENTS

| | | | |
|---|---|---|---|
| 2007/0202943 A1 | 8/2007 | Thomas |
| 2007/0298875 A1 | 12/2007 | Baerlocher et al. |

FOREIGN PATENT DOCUMENTS

| | | | |
|---|---|---|---|
| AU | 567001 | | 11/1987 |
| AU | 585160 | | 6/1989 |
| AU | 589158 | | 10/1989 |
| AU | 593059 | | 2/1990 |
| AU | 630112 | | 3/1990 |
| AU | 628330 | | 9/1992 |
| AU | 633469 | | 1/1993 |
| AU | 649009 | | 5/1994 |
| AU | 655801 | | 1/1995 |
| AU | 1996 70247 | | 4/1997 |
| AU | 680920 | | 8/1997 |
| AU | 710015 | | 9/1997 |
| AU | 766312 | | 10/1997 |
| AU | 722969 | | 6/1998 |
| AU | 1998 63553 | A | 10/1998 |
| AU | 1998 84162 | | 3/1999 |
| AU | 707687 | | 7/1999 |
| AU | 1999 17318 | | 9/1999 |
| AU | 709724 | | 9/1999 |
| AU | 711501 | | 10/1999 |
| AU | 716299 | | 2/2000 |
| AU | 721968 | | 7/2000 |
| AU | 722107 | | 7/2000 |
| AU | 728788 | | 1/2001 |
| AU | 2001 1000032 | | 11/2001 |
| AU | 2001 1000033 | | 11/2001 |
| AU | 748263 | | 5/2002 |
| AU | 749222 | | 6/2002 |
| AU | 754689 | | 11/2002 |
| AU | 758306 | | 3/2003 |
| AU | 1999 43453 | C | 4/2003 |
| CA | 2 334 546 | | 8/2001 |
| DE | 3415114 | | 11/1985 |
| DE | 8710757 | | 11/1987 |
| DE | 3700861 | | 7/1988 |
| DE | 3638100 | | 11/1988 |
| DE | 3915655 | | 11/1990 |
| DE | 3917683 | | 12/1990 |
| DE | 4200254 | | 8/1993 |
| DE | 4301855 | | 7/1994 |
| DE | 195 15 983 | | 11/1996 |
| DE | 19600787 | C2 | 5/1997 |
| DE | 19613455 | C2 | 8/1997 |
| DE | 19936196 | A1 | 1/2001 |
| DE | 3700861 | A1 | 8/2004 |
| EP | 0 342 797 | | 11/1989 |
| EP | 0 444 932 | | 2/1991 |
| EP | 0 449 433 | A2 | 10/1991 |
| EP | 0 521 599 | | 1/1993 |
| EP | 0 798 676 | A1 | 10/1997 |
| EP | 0 874 337 | A1 | 10/1998 |
| EP | 0 926 645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 408 | A2 | 3/2000 |
| EP | 0 984 409 | A2 | 3/2000 |
| EP | 1 003 138 | A2 | 5/2000 |
| EP | 1 467 329 | A2 | 10/2004 |
| EP | 1 498 860 | A1 | 1/2005 |
| EP | 1 513 114 | A2 | 3/2005 |
| EP | 1 528 516 | A2 | 5/2005 |
| EP | 1 528 517 | A2 | 5/2005 |
| GB | 912 685 | | 12/1962 |
| GB | 2 083 936 | A | 3/1982 |
| GB | 2 096 376 | A | 10/1982 |
| GB | 2 097 160 | A | 10/1982 |
| GB | 2 100 905 | A | 1/1983 |
| GB | 2 117 155 | A | 10/1983 |
| GB | 2 117 952 | A | 10/1983 |
| GB | 2 118 445 | | 11/1983 |
| GB | 2 144 644 | A | 3/1984 |
| GB | 2 137 392 | A | 10/1984 |
| GB | 2 139 390 | | 11/1984 |
| GB | 2 142 457 | A | 1/1985 |
| GB | 2 147 773 | | 5/1985 |
| GB | 2 148 135 | | 5/1985 |
| GB | 2 151 054 | A | 7/1985 |
| GB | 2 153 572 | A | 8/1985 |
| GB | 2 161 008 | A | 1/1986 |
| GB | 2 161 009 | A | 1/1986 |
| GB | 2 170 636 | A | 8/1986 |
| GB | 2 180 682 | A | 4/1987 |
| GB | 2 181 589 | A | 4/1987 |
| GB | 2 183 882 | A | 6/1987 |
| GB | 2 201 821 | A | 9/1987 |
| GB | 2 191 030 | A | 12/1987 |
| GB | 2 222 712 | A | 3/1990 |
| GB | 2 226 436 | A | 6/1990 |
| GB | 2 226 907 | A | 7/1990 |
| GB | 2 231 189 | | 11/1990 |
| GB | 2 242 300 | | 9/1991 |
| GB | 2 282 690 | | 4/1995 |
| GB | 2 313 792 | | 10/1997 |
| GB | 2 322 217 | A | 8/1998 |
| GB | 2 333 880 | A | 9/1998 |
| GB | 2 328 311 | | 2/1999 |
| GB | 2 353 128 | A | 2/2001 |
| GB | 2 383 668 | A | 11/2001 |
| GB | 2 387 703 | | 10/2003 |
| JP | 7148307 | | 6/1995 |
| JP | 2002-320703 | | 11/2002 |
| WO | WO 94/12256 | | 6/1994 |
| WO | WO 95/22811 | | 8/1995 |
| WO | WO 95/30944 | | 11/1995 |
| WO | WO 97/12338 | | 4/1997 |
| WO | WO 97/27568 | | 7/1997 |
| WO | WO 97/32285 | | 9/1997 |
| WO | WO 98/35309 | | 8/1998 |
| WO | WO 98/47115 | | 10/1998 |
| WO | WO 98/51384 | | 11/1998 |
| WO | WO 99/03078 | | 1/1999 |
| WO | WO 99/10849 | | 3/1999 |
| WO | WO 00/12186 | | 3/2000 |
| WO | WO 00/32286 | | 6/2000 |
| WO | WO 00/66235 | | 11/2000 |
| WO | WO 00/76606 | | 12/2000 |
| WO | WO 01/10523 | | 2/2001 |
| WO | WO 01/15055 | | 3/2001 |
| WO | WO 01/15790 | | 3/2001 |
| WO | WO 01/26019 | | 4/2001 |
| WO | WO 01/33478 | | 5/2001 |
| WO | WO 02/07836 | | 1/2002 |
| WO | WO 03/026754 | | 4/2003 |
| WO | WO 03/030066 | | 4/2003 |
| WO | WO 03/075235 | | 9/2003 |
| WO | WO 03/083789 | | 10/2003 |
| WO | WO 2004/035161 | | 4/2004 |
| WO | WO 2004/066061 | | 8/2004 |
| WO | WO 2005/027058 | | 3/2005 |
| WO | WO 2005/076193 | | 8/2005 |
| WO | WO 2005/081623 | | 9/2005 |
| WO | WO 2005/083599 | | 9/2005 |
| WO | WO 2005/099425 | | 10/2005 |
| WO | WO 2005/099845 | | 10/2005 |
| WO | WO 2005/106702 | | 11/2005 |
| WO | WO 2005/113093 | | 12/2005 |
| WO | WO 2006/014770 | | 2/2006 |
| WO | WO 2006/014883 | | 2/2006 |
| WO | WO 2006/014990 | | 2/2006 |
| WO | WO 2006/039366 | | 4/2006 |

OTHER PUBLICATIONS

American Bandstand Article written by in Strictly Slots, published in 2002.

American Bandstand Brochure written by Anchor Games, published in 2001.

(56) References Cited

OTHER PUBLICATIONS

Aristrocrat Brochure, written by Aristocrat Gaming, published in 2004.
Atronic Systems Progressive Products at G2E, published by Atronic in 2004, printed from ForRelease.com.
Austin Powers in Goldmember™ Advertisement written by IGT, published in 2003.
Bally Slot Machines Electro-Mechanicals 1964-1980 Book [In Part], Revised 3rd Edition written by Marshall Fey.
Big Shot!™ Advertisement published by Aristocrat Technologies, Inc., published in 2002.
Big Top Keno Advertisement published by Aristocrat Technologies, Inc., published in 2000.
Bingo Game Brochure written by Casino Data System, published in 1998.
Bonus Roulette Brochure written by F. Franco, published prior to Sep. 2003.
Buck's Roulette Brochure written by R. Franco, published prior to Sep. 2003.
Cartoon Jackpots description, printed from www.ballygaming.com/home.asp, on Feb. 4, 2005.
Cash Express Advertisements, written by Aristocrat, published in 2002.
Cashing in Article, written by Frank Legato, published in Strictly Slots Aug. 2006.
Chariot's of Fortune Brochure written by R. Franco, published.prior to Sep. 2003.
Classic Pot of Gold Brochure written by Ace Coin Equipment Ltd., published prior to Sep. 2003.
Crazy Fruits Article written by Strictly Slots, published in Apr. 2001.
Cyberdyne Gaming Brochure written by Cyberdyne Gaming, published prior to Sep. 11, 2003.
Double Diamond Girls Advertisement, written by A.C. Coin and Slot Services Company, published prior to Sep. 11, 2003.
Double Spin Five Times Pay Advertisement, written by IGT, published prior to 2000.
Double up Poker Game Description written by IGT, available prior to Sep. 2000.
Easy Riches Article, written by Strictly Slots, published in Aug. 2001.
Elvira® Mistress of the Dark™ Advertisement written by IGT, published in 2002.
Elvis Hits Advertisement written by IGT, published in 1999.
Fast Buck Systems Manual, written by International Game Technology, available to Mirage shift supervisors at least as early as May 30, 1990.
Fortune Cookie Brochure written by IGT, published in 2000.
Full House Brochure written by Anchor Games, published in 2000.
Gold Fever Advertisement, written by Atronic International Casino, published in 1999.
Gold Fever Advertisement, written by Casino Data Systems, published in 1997.
High Low Card Game written by Qeocities.com, printed May 3, 2001.
High Roller Video Article, written by Frank Legato, published in Strictly Slots Mar. 2001.
Holy Smoke Brochure written by Impulse Gaming Ltd., published prior to Sep. 2003.
Honeymooners Advertisement, written by AC Coin & Slot, published in 2002.
Hot Shot Progressive Article, written by Strictly Slots, published in Feb. 2006.
In Between Game Description written by IGT, available prior to Sep. 2000.
Jack and the Beanstalk™ Article written by Strictly Slots, published Jul. 2002.
Jackpot Bingo, [online] [printed on Apr. 12, 2001]. Retrieved from the Internet at <URL: http://www.csds.com/gaming/g-progressiv.htm>.
Jackpot Carnival Hyperlink Advertisement, written by Aristocrat, published prior to 2002.
Jackpot Hotline Advertisement, written by AC Coin and Slot, published prior to Sep. 2003.
Jackpot Hunter Advertisement, written by IGT, available prior to Jan. 2005.
Jewel in the Crown Advertisement, written by IGT, published in 1999.
Jewel in the Crown Brochure written by Barcrest, Ltd, published prior to 2000.
King of the Grill™ Brochure written by AC Coin & Slot, published prior to Sep. 2003.
Lemons, Cherries and Bell-Fruit-Gum written by Richard M. Bueschel, pp. 1-4, 39-41, 64, 70, 137, 149-150, 195-196 and 251, 304-314, published Nov. 1995.
Line-Up Brochure written by AC Coin & Slot, published prior to Sep. 2003.
Little Green Men Jr.™ Advertisement written by AC Coin & Slot, published prior to Sep. 11, 2003.
Little Green Men Jr.™ Article written by Strictly Slots, published in Feb. 2003.
Magic 8 Ball Advertisement written by IGT, published in 2002.
Match Reel Game Bonus Description, written by IGT, published prior to 2000.
Mikohn Product Catalog, Chapters 1, 2, 6, 7 and 8, written by Mikohn, published in Jan. 1993.
Mikohn Ripley's Believe It or Not Article written by Strictly Slots published in 2001.
Mikohn Super Controller Manual, Chapters 1 to 3 and 6 to 7, written by Mikohn, published in 1989.
Millioniser Article, written by Strictly Slots, published in Mar. 2004.
Miss America Brochure written by AC Coin & Slot, published prior to Sep. 11, 2003.
Mix and Match Advertisement published by AC Coin & Slot, published prior to Sep. 2003.
Mix and Match Article written by Strictly Slots, published in Apr. 2002.
Money Grab Article written by Strictly Slots, published in Apr. 2001.
Money Time advertisement, written by Mikohn Gaming, published in 1999.
Money to Burn Brochure written by WMS Gaming, Inc., published prior to 2001.
Monster Match Article, published in Strictly Slots Jan. 2002.
Monte Carlo Advertisement written by Bally Gaming, published prior to Sep. 2002.
M-Slot Series Primary Reel Product description from Lemons, Cherries and Bell-Fruit-Gum, written by Richard M. Bueschel, published in 1995.
On the Money! Article written by Strictly Slots, published in Dec. 2000.
Payout!™ Advertisement written by www.csds.com/Gaming/Products_/g_Payout.htm, printed on Jan. 15, 2001.
Payout!™ Article written by Casino Data Systems, published prior to Sep. 2003.
PEM—Precision Electronic Meter, written by GRIPS Electronic GmbH, printed from website reported as archived on Feb. 20, 1997 (available at http://web.archive.org/web/19970220165753/www.grips.com/pem.htm).
Penguin Pucks article, written by Note in Gaming Marketplace, published prior to 2004.
Pick a Prize Brochure written by Acres Gaming Incorporated, published prior to 2001.
Player Tracking on Slots, written by GRIPS Electronic GmbH, printed from website reported as archived on Feb. 20, 1997 (available at http://web.archive.org/web/19970220165921/www.grips.com/playtrac.htm).
Plinko Showcase Show Down written by International Game Technology, published in 2001.
Power Slotto Brochure published by AC Coin & Slot prior to 2002.
Press Your Luck Brochure published by AC Coin & Slot prior to 2002.
Progressive Jackpot System article, printed from casinomagazine.com.managearticle.asp@c_290&a=518, on Jun. 21, 2004.
ProLINK Progressive Controller User/Reference Manual, written by Casino Data Systems, published in Apr. 1997.

(56) References Cited

OTHER PUBLICATIONS

Quick Pick Paytime Brochure written by Acres Gaming Incorporated, published prior to 2001.
R&B™ Brochure published by AC Coin & Slot, published prior to Sep. 2003.
Reel Dice Advertisement written by Gerber & Glass, published in 1936.
Royal Roulette Brochure written by Impulse Gaming Ltd., published prior to Sep. 2003.
Run for Your Money Game Description written by Barcrest, published prior to 2001.
Scarne, Scarne's Encyclopedia of Card Games, 1973, HarperCollins Publishers, Inc., 278-279.
Scarne's New Complete Guide to Gambling (© 1997)—John Scarne, pp. 162-167.
Silver City Roundup Brochure published by AC Coin & Slot, published prior to Sep. 2003.
Slot Line Progressive Advertisement, written by IGT, published in 1993.
Slot Line Progressive Advertisement, written by IGT, published in 1994.
Slot Line Progressive Advertisement, written by IGT, published in 1995.
Slot Line Progressive Mega Jackpots Advertisement, written by IGT, published in 1997.
Slot Line Temperature Rising Game Description, written by IGT, published in 1998.
Slot Machine Buyer's Handbook, a Consumer's Guide to Slot Machines written by David L. Saul and Daniel R. Mead, published in 1998.
Slot Machines a Pictorial History of the First 100 Years (pp. 216, 242 to 243), 5th edition, written by Marshall Fey, published in 1983-1997.
Slot Machines and Coin-Op Games written by Bill Kurtz, pp. 16, 65, 105 and 111, 1991.
Slot Machines on Parade, 1st edition written by Robert N. Geddes and illustrated by Daniel R. Mead, published in 1980.
Sphinx Brochure written by Atronic Casino Technology, Ltd., published in 1997.
Spin Til You Win Information Sheet written by IGT, published in 1996.
Spin-A-Lot Brochure written by Acres Gaming Incorporated, published prior to 2001.
Super Cherry Advertisement written by IGT in 2001.
Surprize Gaming Machine Advertisement, written by Aristocrat Leisure Industries, Australia, published prior to 2004.
Surprize Software Specification for MV2030—var 01, written by Aristocrat Leisure Industries, Australia, published prior to 2004.
Take Your Pick Article written by Strictly Slots, published in Mar. 2001.
Take Your Pick Brochure and Article written by IGT/Anchor Games, Strictly Slots, published in 1999.
Texas Tea [online], [printed on Mar. 21, 2001]. Retrieved from the Internet at <URL: http://www.igt.com/games/new_games/texastea.html>.
Texas Tea Advertisement, written by IGT, published in 2000.
Texas Tea Article written by Strictly Slots, published in Jul. 2000.
Top Dollar Brochure written by IGT, published in 1998.
Wheel & Deal Brochure written by Strictly Slots, published in Dec. 2001.
Wheel of Fortune Advertisement written by IGT, published in 1998.
Wheel Poker Article, written by Strictly Slots, published prior to 2002.
Wide Area Progressive Link System, written by GRIPS Electronic GmbH, printed from website reported as archived on Feb. 20, 1997 (available at http://web.archive.org/web/19970220165457/www.grips.com/wap.htm).
Yahtzee Bonus Advertisement written by Mikohn, published in 1999.
Zorro Advertisement, written by Aristocrat, published in 2004.

GAMING METHOD AND DEVICE INVOLVING PROGRESSIVE WAGERS

PRIORITY CLAIM

This application is a continuation of, claims priority to and the benefit of U.S. patent application Ser. No. 12/684,355, filed on Jan. 8, 2010, which is a divisional of, claims priority to and the benefit of U.S. patent application Ser. No. 11/196,645, filed on Aug. 2, 2005, now U.S. Pat. No. 7,666,093, which claims priority to and the benefit of U.S. Provisional Patent Application Ser. No. 60/598,305, filed on Aug. 3, 2004, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

FIELD OF THE INVENTION

The embodiments of the present invention relate to casino wagering games with one or more progressive awards that increase in value based on a random event, or other pre-established event or outcome, and/or reset if not won during a bonus event.

BACKGROUND

A number of wagering games feature awards which increase in value over time. Such awards are known as progressive awards. Typically progressive awards begin at a specific value known as a seed value or reset value and then increase over time based upon the number of eligible placed wagers. Usually, progressive awards increase by utilizing a specified fraction of each eligible placed wager. The phrase “eligible wager” refers to a pre-established wager amount, typically the maximum possible wager, required for a progressive award to be won. Furthermore, some gaming jurisdictions mandate that only wagers which can result in a progressive award can be used to fund progressive award increases.

A common progressive award works as follows: When the game is first offered, or after the prior progressive award is won, the progressive award value is set to a specific value. Thereafter, a set percentage of each eligible wager is added to the progressive award value until a game outcome occurs resulting in a player winning the progressive award.

A progressive award can involve wagers and play from a single machine or a number of machines. In the latter case, known as linked progressives, machines are configured in a bank of adjacent machines, or a plurality of machines across multiple banks within a casino, or across a plurality of casinos within a regional geographic area or across a plurality casinos across a plurality of regional geographic areas. In many games with progressive awards, especially with linked progressive awards, increases in the progressive award are cached such that the award value may be displayed as continuously and smoothly increasing rather than jumping up in rapid, varied amounts. The progressive award is often displayed in a manner reminiscent of a car odometer to better give the impression of continual and smooth jackpot growth.

One notable exception to the common practice of increasing a progressive award for each eligible wager is evident in Silicon Gaming’s video poker game, “Phantom Belle Playoff”, that offers a discrete progressive award increase of a certain size after a certain number of eligible wagers have been placed. In this case, the progressive award increases after a specific number of maximum wagers has been placed.

Most games with progressive awards are configured to pay the progressive award based upon a primary game outcome. For example, in a slot machine game, a progressive award is won in response to a certain set of symbols, typically the top-most symbol(s), aligned along a certain pay line when a maximum wager has been placed. However there are some slot games that pay a progressive award as the outcome of a bonus event. Another example relates to a card game wherein a certain hand outcome occurs, such as a royal flush outcome.

Many casino games offer bonus events or bonus rounds beyond the primary game. Such a bonus can be triggered in response to an outcome of the primary game. For example, in a slot machine game the outcome may be based on certain symbols appearing in a certain configuration. Other games can be offered whereby the bonus is triggered based on a secondary event. For example, in the video poker game, Phantom Belle Playoff, the appearance of a special card from the deck has no effect on the primary game but causes a bonus round to be launched.

In a bonus event, the player typically is awarded a prize based upon a secondary outcome selection different from the primary game outcome. In slot games, like “Wheel of Gold” or “Wheel of Fortune”, for example, the bonus round is triggered when a bonus symbol appears in a pre-established manner (either on the pay line on the last reel or on all positions on the pay line, based upon the game definition) and the player has placed a maximum wager. During the bonus round, the player initiates the spinning of the bonus wheel. Eventually the wheel slows to a stop. The wheel is separated into segments, each depicting an award. The player wins the award depicted on the wheel segment identified by a single pointer at an edge of the wheel after the wheel stops.

A bonus event typically involves the following features:

results in the player receiving an award;

the actual award amount is often unknown to the player until bonus event is played;

uses prize reveal and/or selection mechanisms beyond the main game outcome;

player input is required to initiate the start of the bonus game;

in some cases, a bonus event may require increased player interactivity such as the player identifying selection spots to reveal hidden symbols; and/or in some cases, a bonus event may involve actual player decisions such as whether to accept the current bonus award or forgo the same in lieu of the opportunity to seek a larger bonus award.

SUMMARY

One embodiment of the present invention comprises a method of conducting a wagering game, accepting a player wager, generating a game outcome, resolving the player wager by paying the player an award in response to the game outcome matching a predefined winning outcome, and in response to the game outcome matching a predefined outcome, increasing an associated progressive award value.

The embodiments of the present invention include a method and device for offering a casino game with one or more progressive awards with some or all of the following features:

- the progressive award only increases based upon some primary or secondary game outcome;
- for a non-linked progressive award corresponding to a game linked to a player tracking system, any progressive award gains follow the player between play sessions; and/or
- the progressive award can only be won during a bonus round and whether or not the bonus award is won, the bonus award is reset after the bonus game ends.

Thus, instead of increasing the progressive award for every eligible wager, the progressive jackpot only increases in response to a certain primary or secondary game outcome. Such a scheme increases player excitement and interest by making jackpot increases a special event instead of the standard routine, automatic event. The jackpot increase can become a psychological reward which does not have an immediate negative financial impact on the casino offering the game. The feature may also help encourage players to play a given game more often since the players may feel more directly responsible for the increased progressive awards based upon their actual play.

Examples of primary progressive award increase triggers include (but are not limited to):

- appearance of certain symbol(s), perhaps in certain location(s), during play of a slot machine game;
- appearance of certain card(s), perhaps in certain hand positions, during play of a card game;
- the occurrence of certain defined winning outcomes; and/or
- the occurrence of a non-winning outcome, especially in a very high hit frequency game.

The most basic example of a secondary progressive award increase trigger is increasing the progressive award randomly and independent of the primary game outcome. In one example, it involves the display of a secondary gaming element such as a wheel or other display. Another secondary event example involves the use of a special feature reel in addition to standard game reels. Then, if a certain symbol appears on the special feature reel, perhaps in conjunction with certain primary game outcomes, it may trigger an increase of the progressive award.

As with standard games having progressive awards, a game may be configured to allow only progressive award increases when a certain betting requirement is met, for example, when a maximum wager is placed. Alternately, a game can be configured where all placed wagers are eligible.

When a progressive award is increased, there are a few methods to define the amount of the increase. A game can be configured to add the same amount for the same trigger. For games that allow for progressive award increases for a multiplicity of wager amounts, the award increase can be scaled based upon the actual wager amount. Another game definition can result in different types of progressive award increase triggers that result in different progressive award increase amounts. Another game definition can result in the progressive award increase being randomly selected, perhaps from a distribution of possible awards. Such variable progressive award increases can be part of a bonus round event. Another game definition can allow for different triggers that cause an increase in different progressive award values. Furthermore, different triggers can cause different increases in the progressive award value. Moreover, a game definition can allow for multiple simultaneous triggers, each of which causes a progressive award increase, possibly of the same progressive award and/or different progressive awards.

Another aspect of the embodiments of the present invention is the concept of a personal progressive award following a player. Specifically, some game devices allow for individual player tracking, usually initiated by having the player insert his or her unique player identification card into a card reader installed in the machine. Player tracking is also possible in games offered via the Internet wherein the player is required to provide a user ID and password in order to play. A gaming system that can provide player tracking can also be designed to maintain progressive awards between play sessions for the same player. For example, if a given player is able to increase his personal progressive award to a certain amount, the progressive award remains at the same value the next time the player returns to play the game.

Another aspect of the embodiments of the present invention is the concept that a progressive award can only be won during a bonus round, and if the progressive award is not won, the progressive award is reset. For example, when a player initially starts a game having such a feature, the progressive award is set at a certain level which can increase as the player plays, either through traditional progressive award growth mechanisms or through the random increase mechanism aspect of the embodiments of the present invention. The player can only win a progressive award during play of a bonus round. Whether or not the player wins such a progressive award, all such progressive awards are reset upon exiting the bonus round.

There are additional aspects of the embodiments of the present invention related to setting and adjusting the progressive award value based upon the wager amount. One such aspect involves selecting the progressive award reset value based upon the amount of the wager. For example, a progressive jackpot value can be reset to the value of $S \times W$, where S is the base seed value and W is the relevant wager amount placed during the game play when the bonus game or round is activated. Alternatively, a progressive award boost can be applied if a wager in excess of a minimum wager is placed during the game play when the bonus game or round is activated. For example, the jackpot value may be reset to the value S, but if the player's wager W is greater than 1 unit, the jackpot value is increased by $S \times (W-1)$ at the start of the bonus round. In a more specific example, the progressive award is reset to 100 units. Then, if during play of the game, the progressive award value is increased by 60 units, with a 5 unit wager in place, and a game outcome triggers a bonus round or game, the progressive award of 160 units is boosted by 400 units calculated as follows: $100*(5-1)=400$ units to a total progressive award value of 560 units which the player has the opportunity to win during the bonus round.

The above disclosed two jackpot adjustments can both be offered in the same game. Specifically, for a game linked to a player tracking system, the progressive award value is set to S for the first time that a given player plays the game. The first time said player enters the bonus round and the player's wager is greater than 1 unit, a boost of $S \times (W-1)$ is added to the progressive award value. The boost only occurs on the first bonus round event for said player. Upon exiting a bonus round the first time or any subsequent time, the progressive award value is reset to $S \times W$.

All of the above described game features can also apply to game methods and devices which involve a plurality of progressive awards. Other variations, embodiments and features of the present invention will become evident from the following detailed description, drawings and claims.

DETAILED DESCRIPTION

Figure 1:
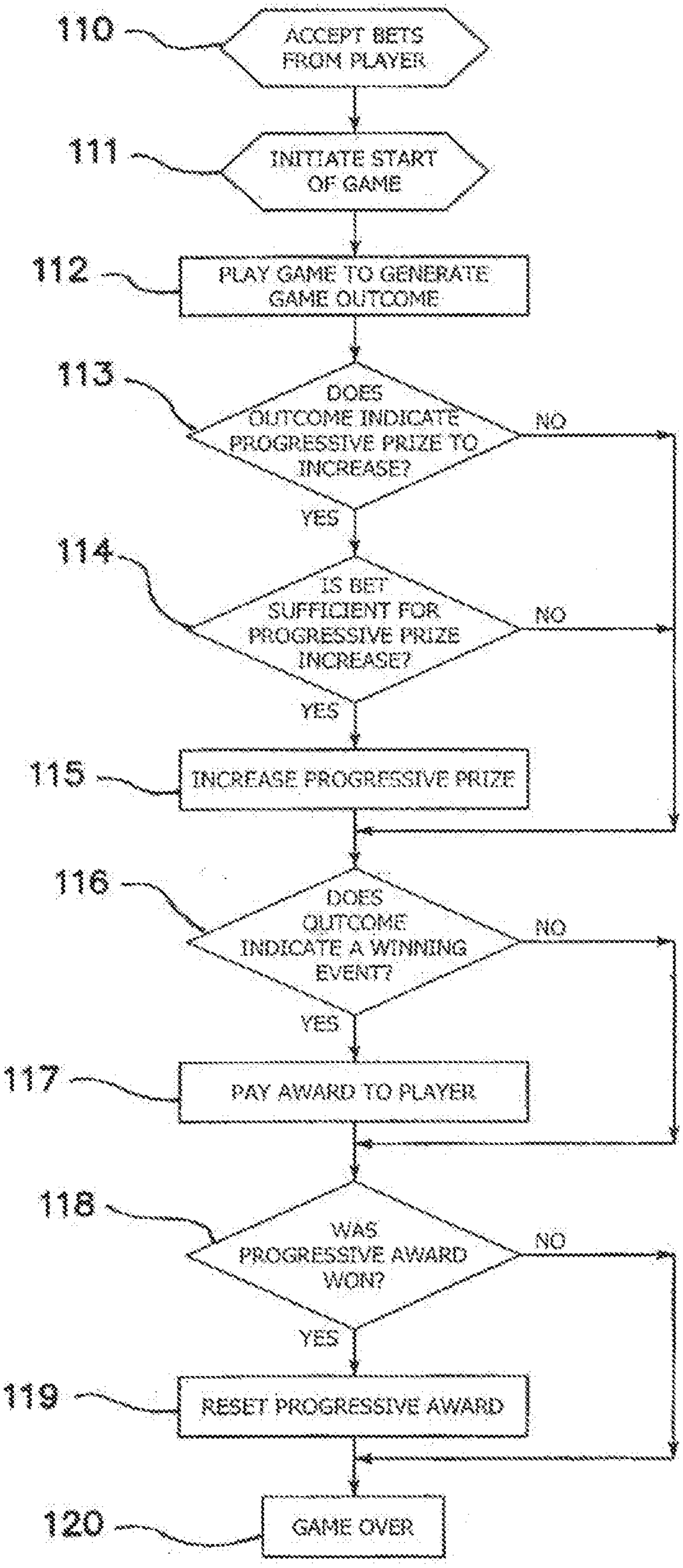
FIG. 1: Block diagram of a game embodiment having a random progressive advancement.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Turning to the drawings, FIG. 1 shows a block diagram 100 detailing one game embodiment of the present invention, namely a game having a random increase in a progressive award value based upon a game outcome. In the block diagram 100, a player first places a wager 110, initiates the game 111 and the game generates an outcome 112. Then, it is determined whether the outcome causes the progressive award value to increase 113. If yes, it is determined whether the player's wager amount is sufficient to cause the progressive award value to increase 114. In other words, increasing the progressive award amount is dependent upon the game outcome and the amount of the player wager. If the answer to the questions at steps 113 and 114 is positive, at step 115, the progressive award value is increased. If the answer to either one of the questions at steps 113 and 114 is negative, the progressive award value is not increased. It is next determined whether the game outcome is a winning outcome 116. If so, the player is paid an award 117. At step 118, it is determined whether the progressive award was won. If not, the game ends 120. If yes, the progressive award value is re-set 119.

It is noted that in block diagram 100, the nature of the game outcome required to cause a progressive award increase is not explicitly stated in accordance with the ability of the embodiments of the present invention to apply to either primary game outcomes and/or secondary game outcomes.

Figure 2:
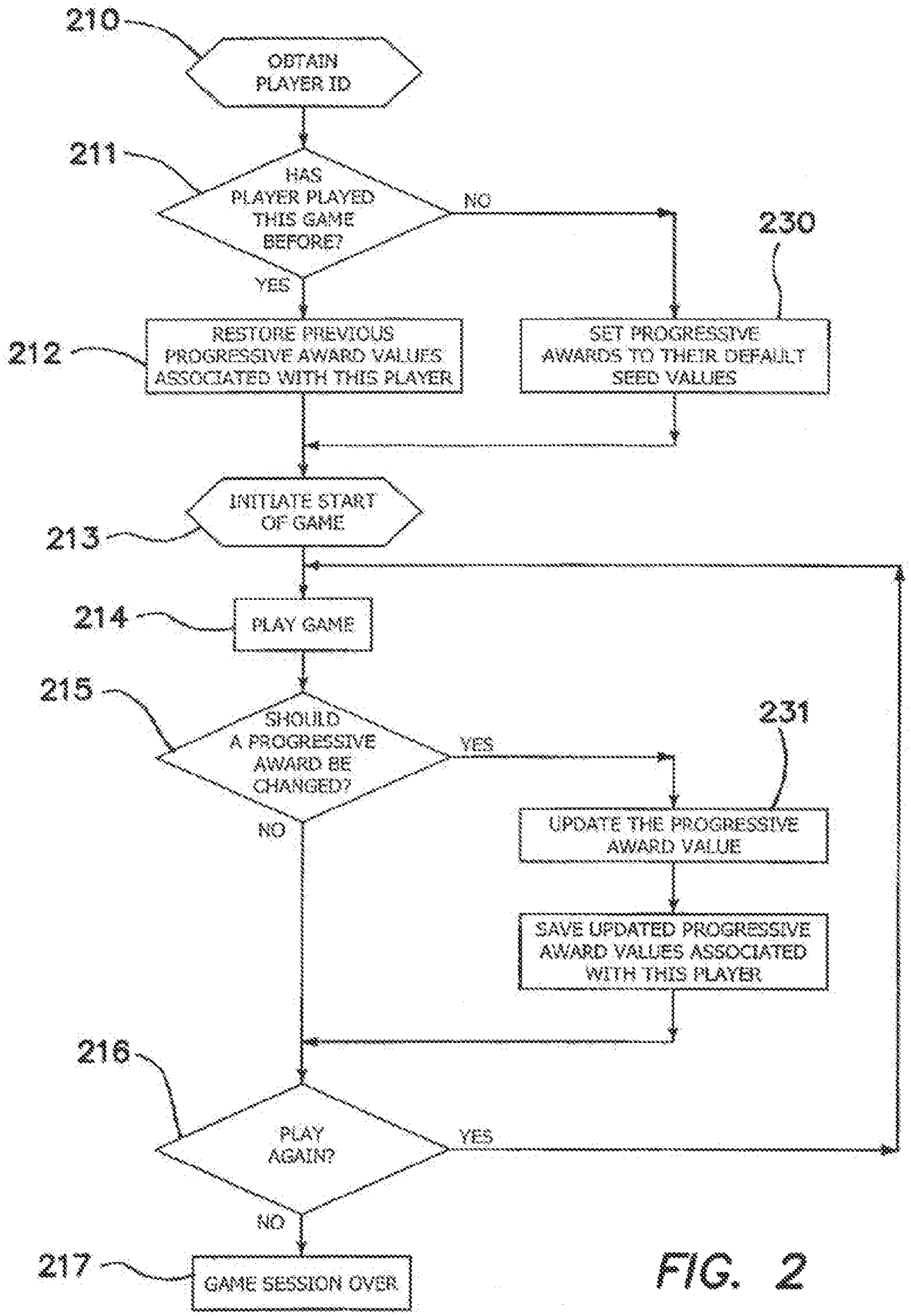
FIG. 2: Block diagram of a game embodiment having a personal progressive award.

FIG. 2 shows a block diagram 200 detailing another embodiment of the present invention, namely a game having a non-linked progressive award whereby progressive award gains carry over between play sessions. In such an embodiment, a player tracking system maintains the carry over of the progressive award in a player file and/or database. To that extent, block diagram 200 details a player playing one or more games (e.g., machine, device or Internet interface) during a single gaming session where each of the games played during the gaming session are associated with the same identified player.

Initially a player tracking system in communication with the game identifies the player 210 and determines whether the player is a repeat player or first time player 211. If the player is a repeat player, the progressive award values are set to the previous values after a last gaming session 212. If the player is not a repeat player, the progressive award values are set to their default seed values 230. The game is then initiated 213 and a game outcome generated 214. Based on the game outcome generated at step 214, it is then determined whether a progressive award should be increased 215. If so, the progressive award value is increased 231 and saved in association with the identified player 232. The player then elects to play the game again 215 or end the game 217. In this configuration the progressive award values are personal to the player and are maintained by a player tracking system.

Figure 3:
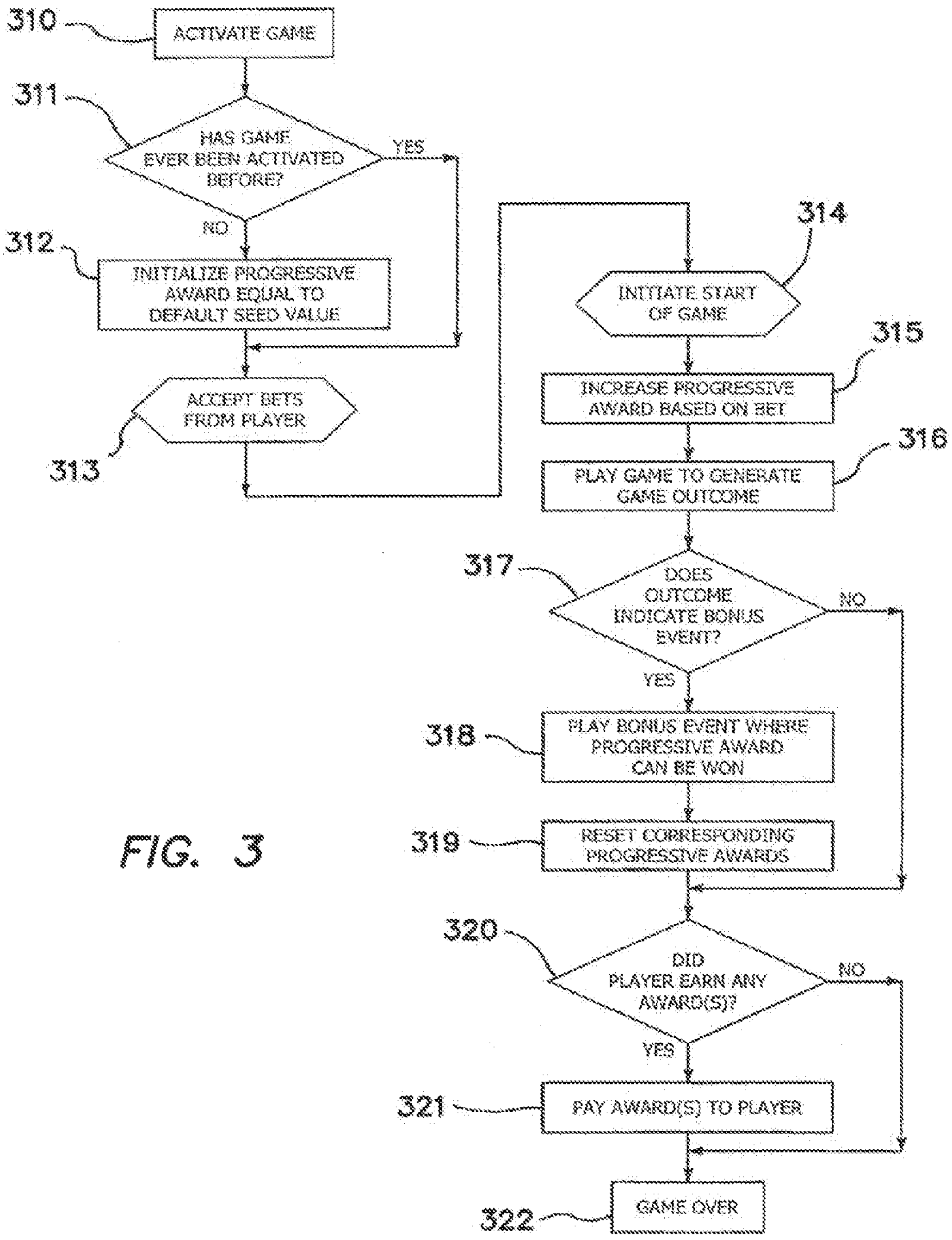
FIG. 3: Block diagram of a game embodiment having a bonus round progressive award (constant advance)

FIG. 3 shows a block diagram 300 detailing another embodiment of the present invention, namely a game having a progressive award that can only be won in a bonus round, and whether or not the progressive award is won, it is reset after the bonus round concludes. The block diagram 300 also takes into account the initial establishment of the progressive award value. It is based on a standard method of increasing the progressive award as a percentage of every eligible wager.

The game is first activated 310 and it is then determined if the game has been activated previously 311. If not, the progressive award value is set at the initial/default seed value 312. Wagers are then accepted from a subject player 313 and the game is initiated by the player 314. Based on the wager amount, the progressive award value is increased 315 and the game is played 316 thus generating a game outcome. It is then determined if the game outcome triggers a bonus event 317. If the game outcome does trigger a bonus event, a bonus game is played during which the progressive award(s) may be won 318. After the bonus game is played, the progressive award values are reset 319. It is then determined whether the player earned any awards 320 and if so, the awards are credited to the player 321. The game ends at step 322.

Figure 4:
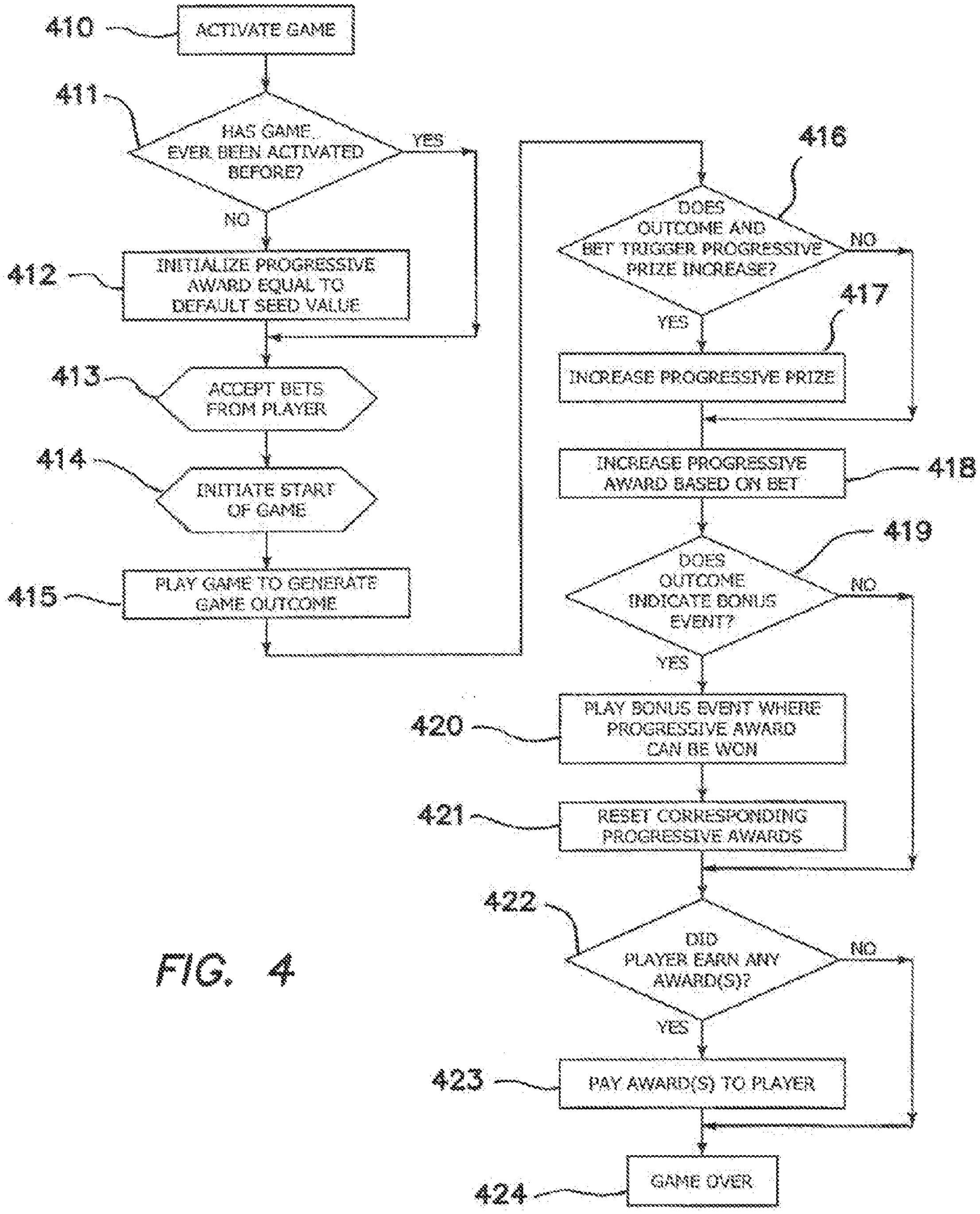
FIG. 4: Block diagram of game embodiment having a bonus round progressive award (random advance)

FIG. 4 shows a block diagram 400 similar to block diagram 300. However, it details an innovative method of randomly increasing the progressive award as described in the embodiments of the present invention.

The game is first activated 410 and it is then determined if the game has been activated previously 411. If not, the progressive award value is set at the initial/default seed value 412. Wagers are then accepted from a subject player 413 and the game is initiated by the player 414 and a game outcome is generated 415. It is then determined if the game outcome triggers a progressive award value increase 416. If yes, the progressive award value is increased 417 and then the progressive award value is increased based on the wager amount 418. It is then determined whether the game outcome triggers a bonus event 419. The bonus game is then played 420 and after the bonus game is played, the progressive award values are reset 421. It is then determined whether the player earned any awards 422 and if so, the awards are credited to the player 423. The game ends at step 424.

Figure 5:
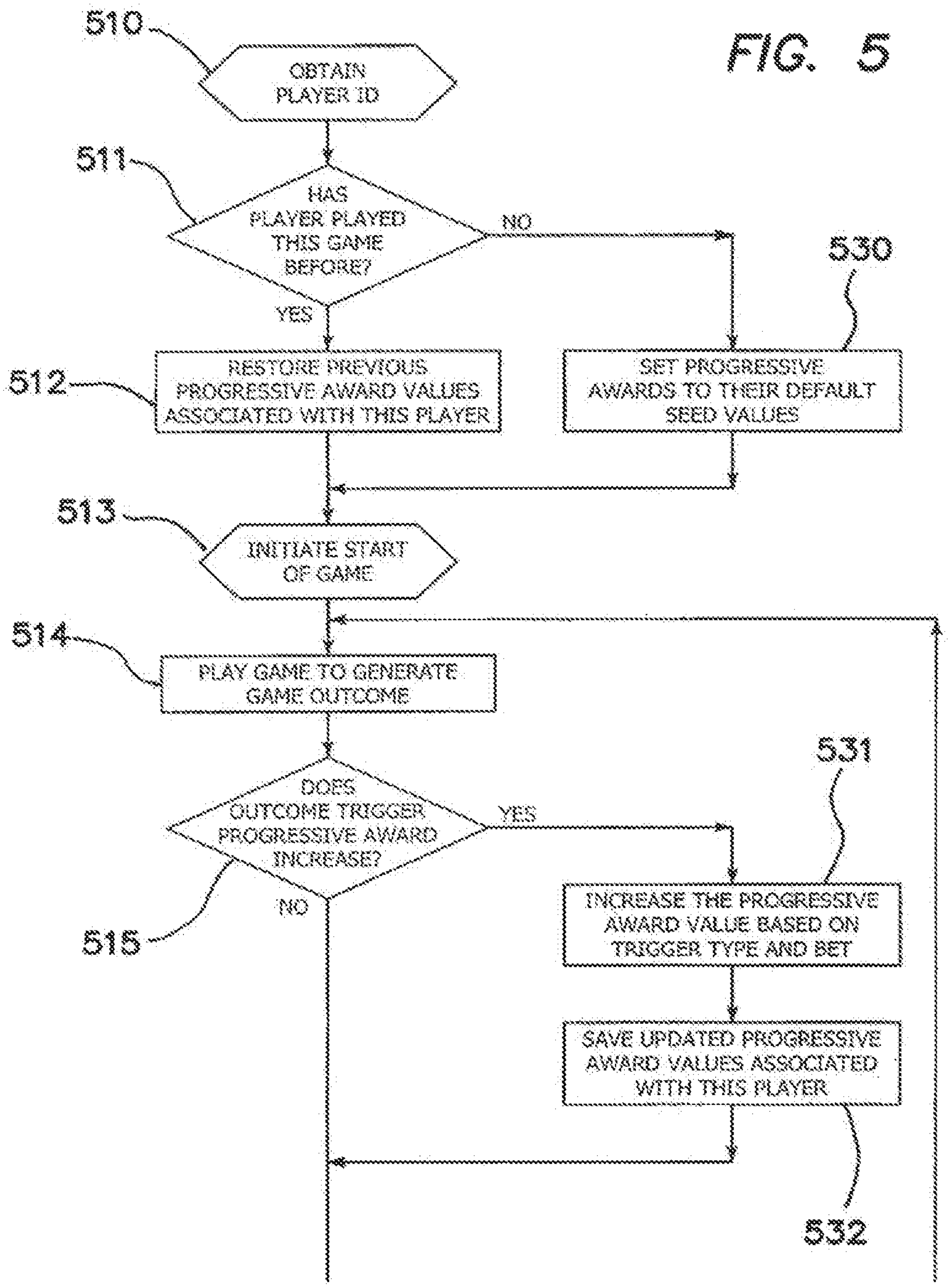
FIG. 5: Block diagram of one exemplary game play.
Figure 5:
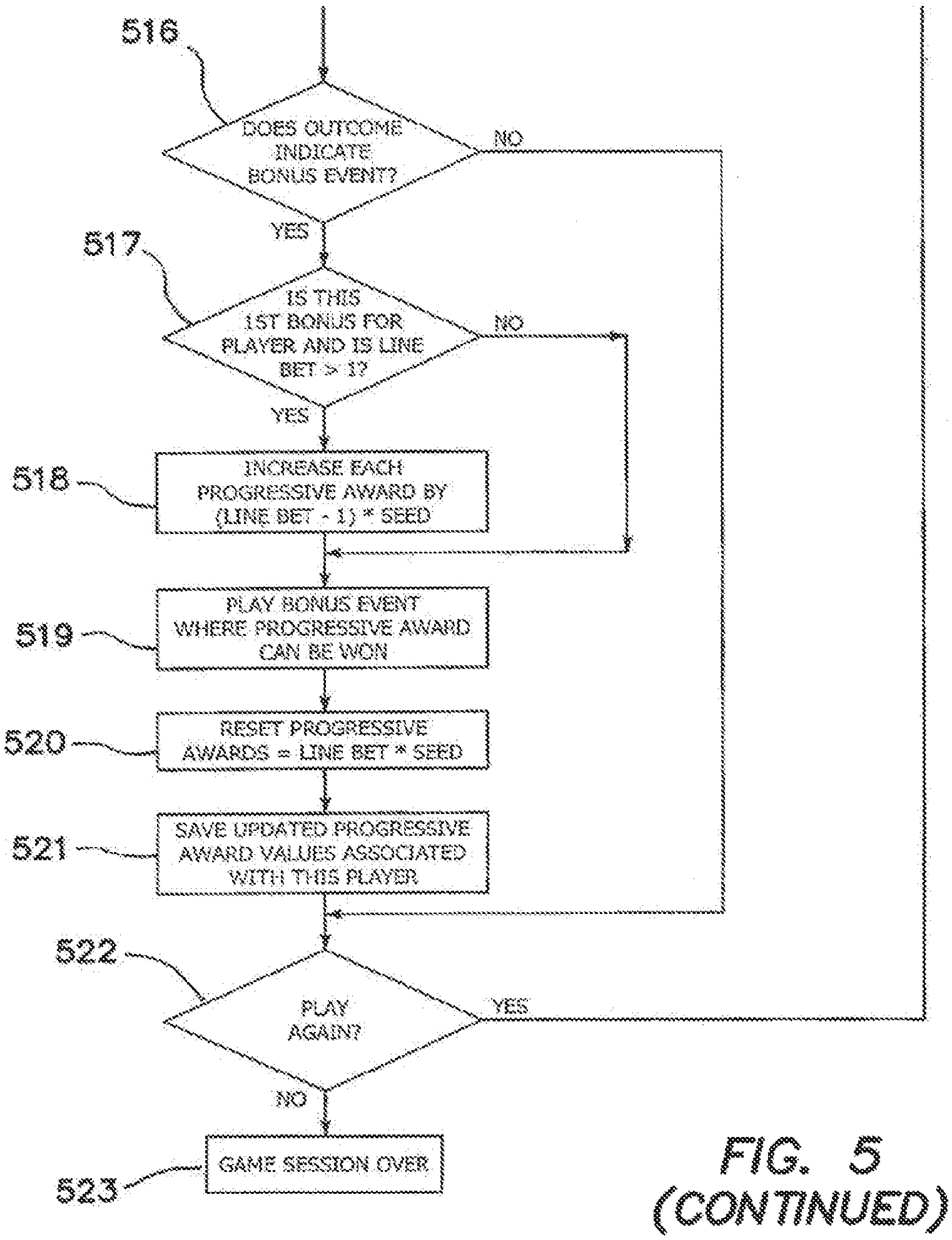

FIG. 5 shows a block diagram 500 detailing an exemplary gaming system and game which combines a number of inventive components in a single game. The player ID is obtained 510 and it is determined whether the player has played previously 511. If the player has not played previously, the progressive award values are set to their default seed values 530, else the progressive award values are restored to their values corresponding to their values the last time said player played said game 512. The player initiates the game 513 which generates a game outcome 514. If the game outcome matches required outcome necessary to trigger a progressive award increase 515, the corresponding progressive award value is increased 531 and the updated value is saved 532. Block diagram 500 applies whether the progressive award increase triggering outcome is based on the primary game outcome or based on a secondary game outcome. It is then determined whether the game outcome triggers a bonus outcome 516. If the game outcome triggers a bonus round, the pay line wager which activated the bonus round is examined to determine if it is greater than one unit 517. If the activating pay line wager is greater than one unit, the progressive awards are increased based upon a difference between the activating pay line wager and one unit 518. Then, the bonus event is played during which the player has the chance of winning at least one of the progressive awards 519. When the bonus event concludes, whether or not any progressive award is earned by the player, the progressive awards are reset 520 and stored 521. The player can then play again 522 or can end his or her play session 523.

Figure 6:
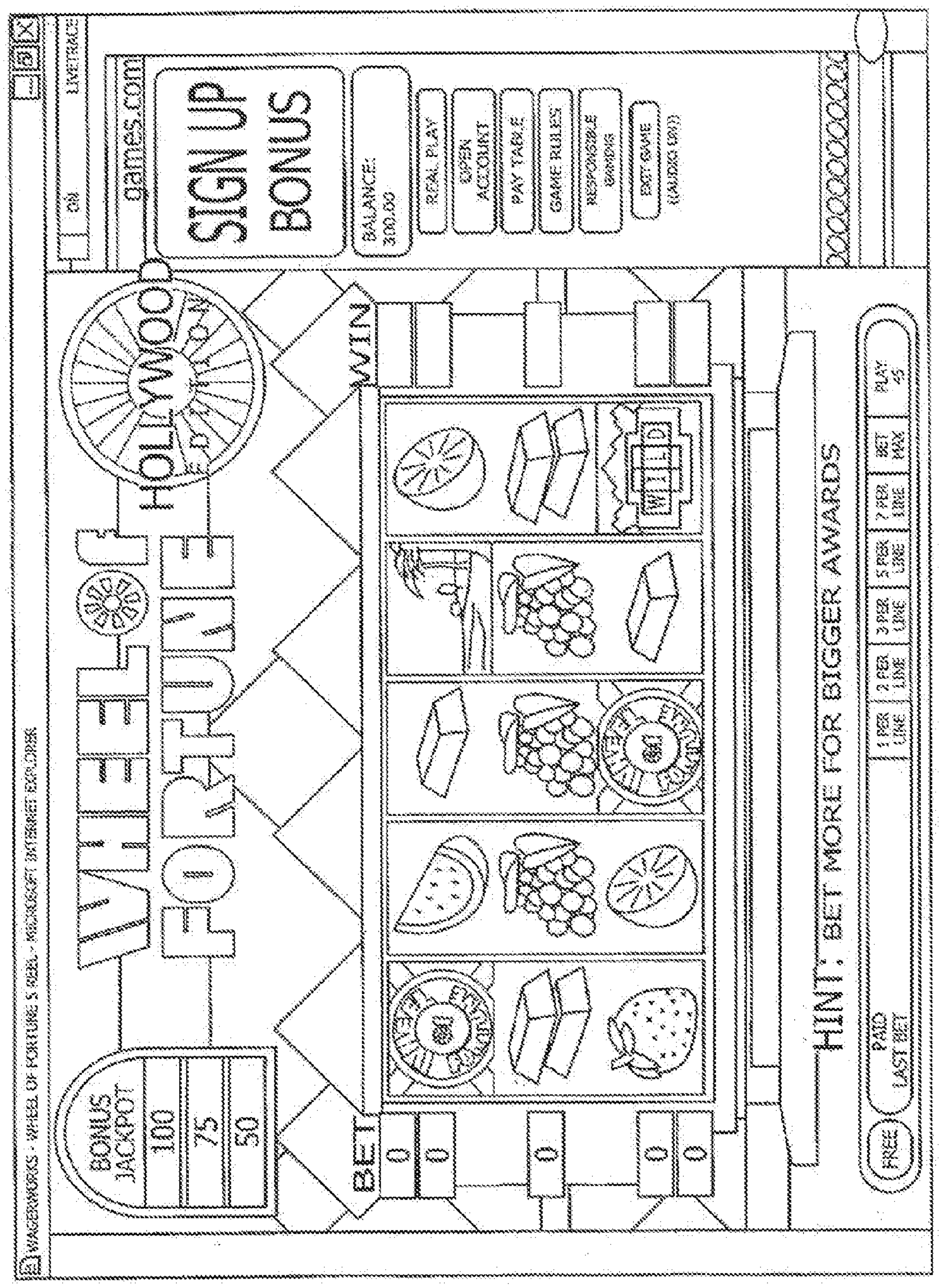
FIG. 6: Screen shot of exemplary game with said screen displaying initial Jackpot seed related to 1st game play.

FIG. 6 shows a screen shot from an exemplary game featuring some of aspects of the embodiments of the present invention. The screen shot shows three progressive awards, referred to as top progressive 610, middle progressive 620 and bottom progressive 630. When the game is played by a player for the first time, the progressive awards are, for example, set to 100 units, 75 units and 50 units, respectively.

Figure 7:
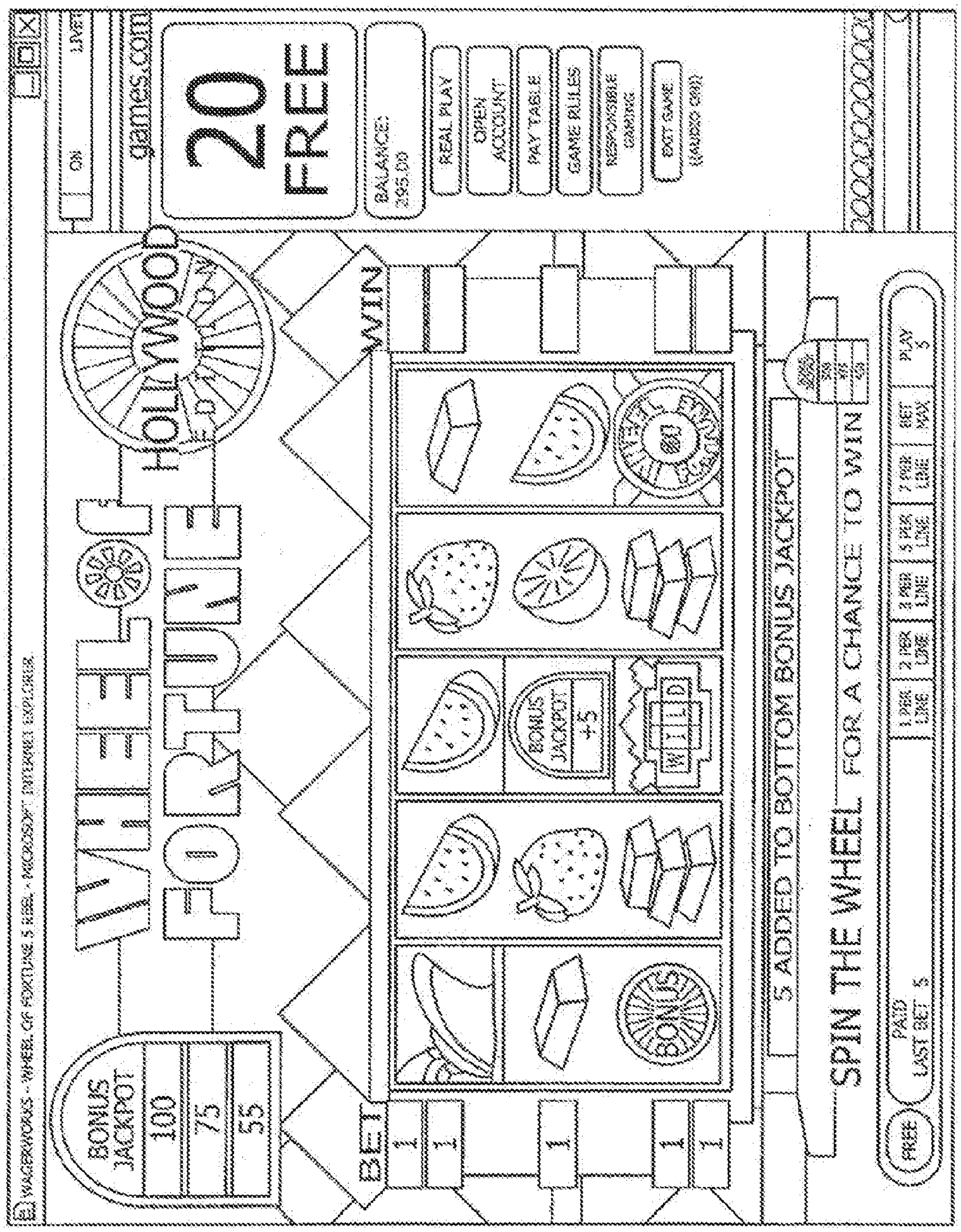
FIG. 7: Screen shot of exemplary game with said screen displaying wager amount added to bottom award.
Figure 8:
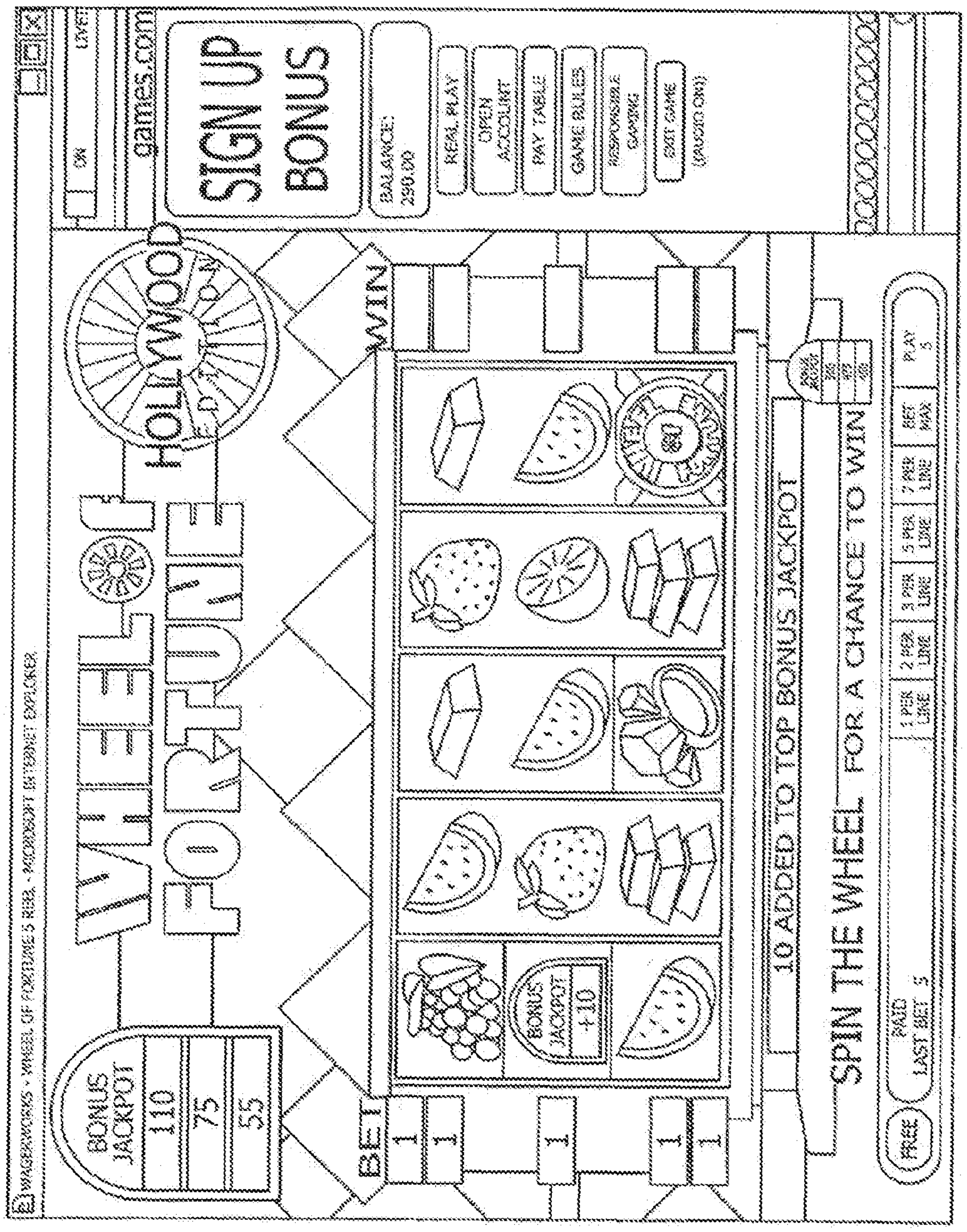
FIG. 8: Screen shot of exemplary game with said screen displaying 2× wager amount added to top award.

FIG. 7 shows a successive screen shot which follows from FIG. 6. A jackpot symbol 640 appears on the third reel, which in one embodiment of the present invention causes the bottom progressive award 630 to increase by a total amount of the wager such that the new value becomes 55 units (i.e., 50 units+5 units=55 units). FIG. 8 shows another screen shot. A jackpot symbol 650 appears on the first reel, which in one embodiment of the present invention causes the top progressive award 610 to increase by twice a total amount of the wager such that the new value becomes 110 units (i.e., 100 units+2*5 units=110 units).

Figure 9:
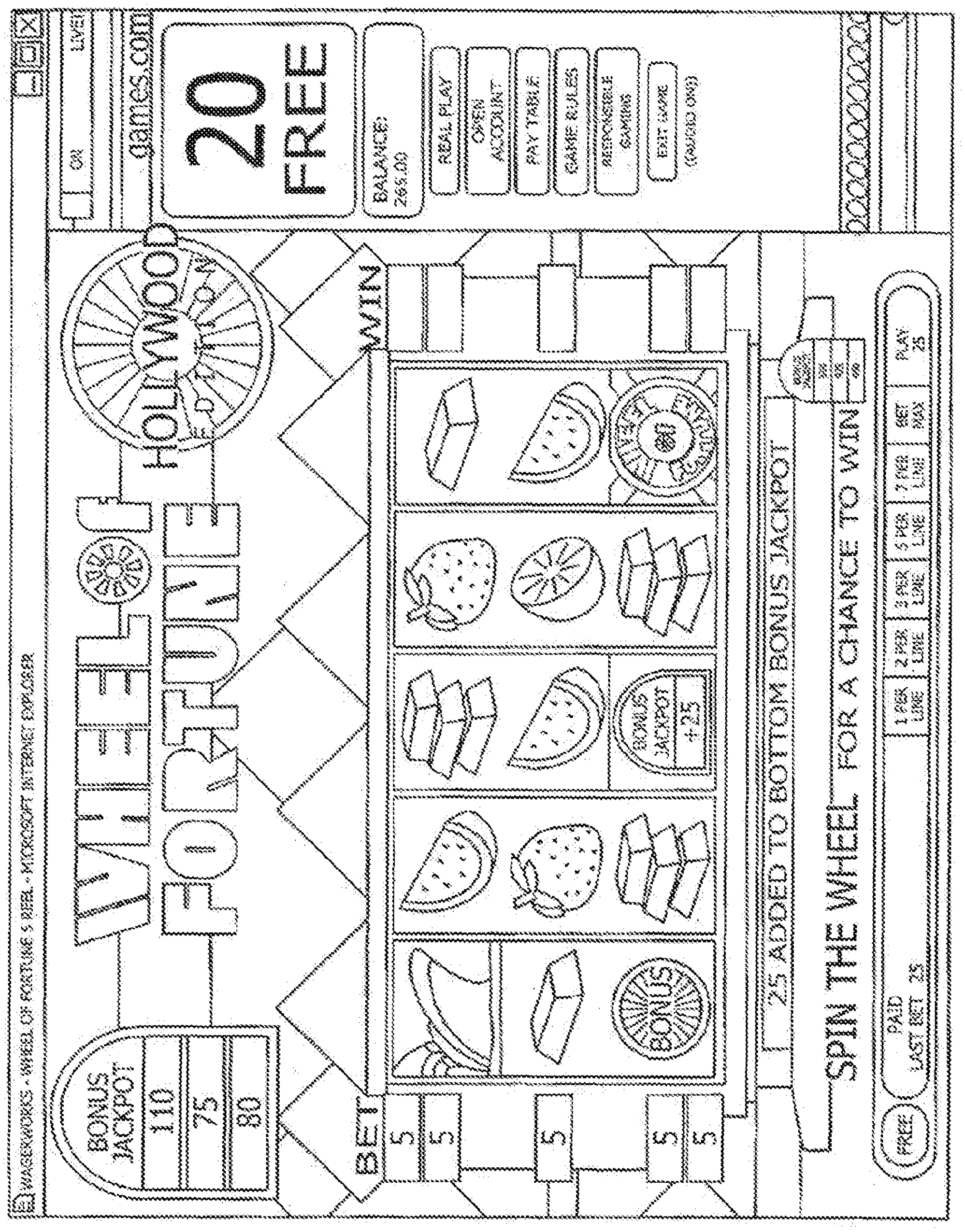
FIG. 9: Screen shot of exemplary game with said screen displaying correspondence between larger wager amount and larger award increases.
Figure 10:
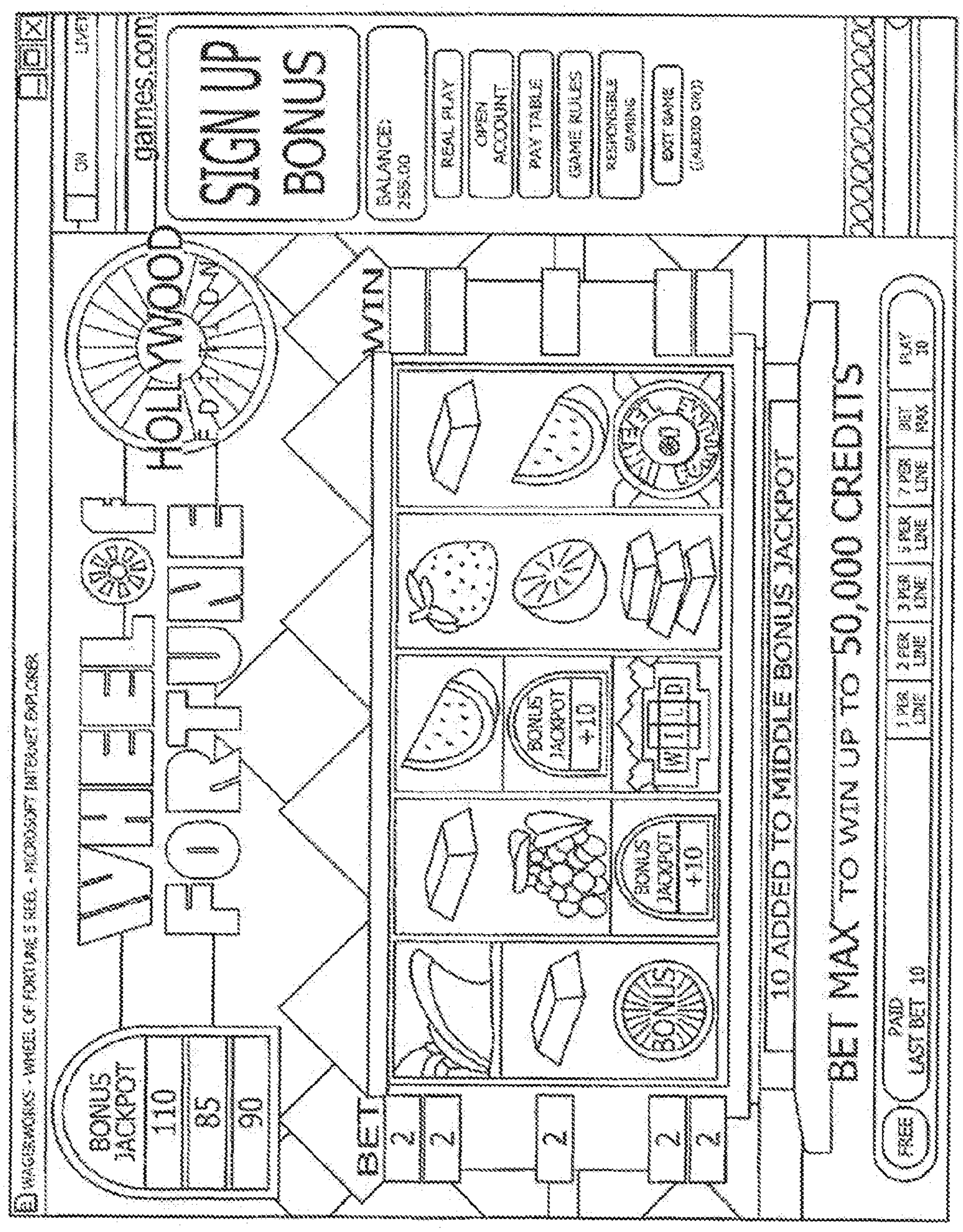
FIG. 10: Screen shot of exemplary game with said screen displaying multiple award increases.

FIG. 9 shows another screen shot. A jackpot symbol 660 appears on the third reel, which in one embodiment of the present invention causes the bottom progressive award 630 to increase by a total amount of the wager. Since in this screen shot, the wager size is 25 units, the new value becomes 80 units (i.e., 55 units+25 units=80 units). FIG. 10 show another screen shot demonstrating that multiple progressive award increase triggering events may occur simultaneously. As shown, two different progressive awards are increased. The jackpot symbol 670 on the 2nd reel causes the middle progressive award 620 to increase while the jackpot symbol 680 on the 3rd reel causes the bottom progressive award 630 to increase. A game message area 680 shown in the screen shot indicates that “10 Added to Middle Bonus Jackpot”, however, this is a dynamic display area which also displays other messages which, in this example, would also include “10 Added to Bottom Bonus Jackpot”.

Figure 11:
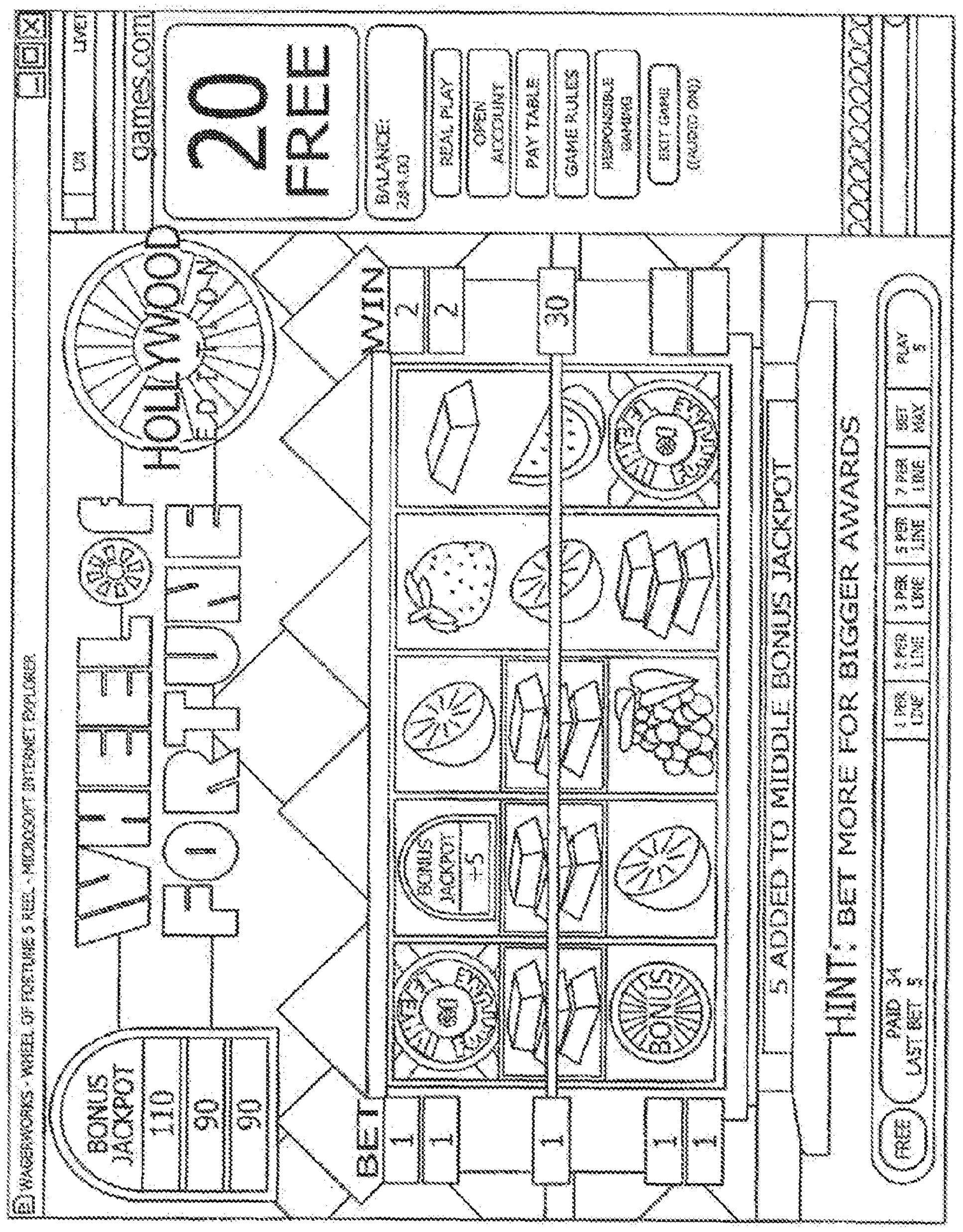
FIG. 11: Screen shot of exemplary game with said screen displaying a winning outcome and corresponding award increase.

FIG. 11 shows another screen shot demonstrating that progressive award increase triggers and primary game winning outcomes may occur simultaneously. As shown 32 units 690 are won based on the game outcome defined by the symbols on the reels and the middle progressive award value 620 has been increased.

Figure 12:
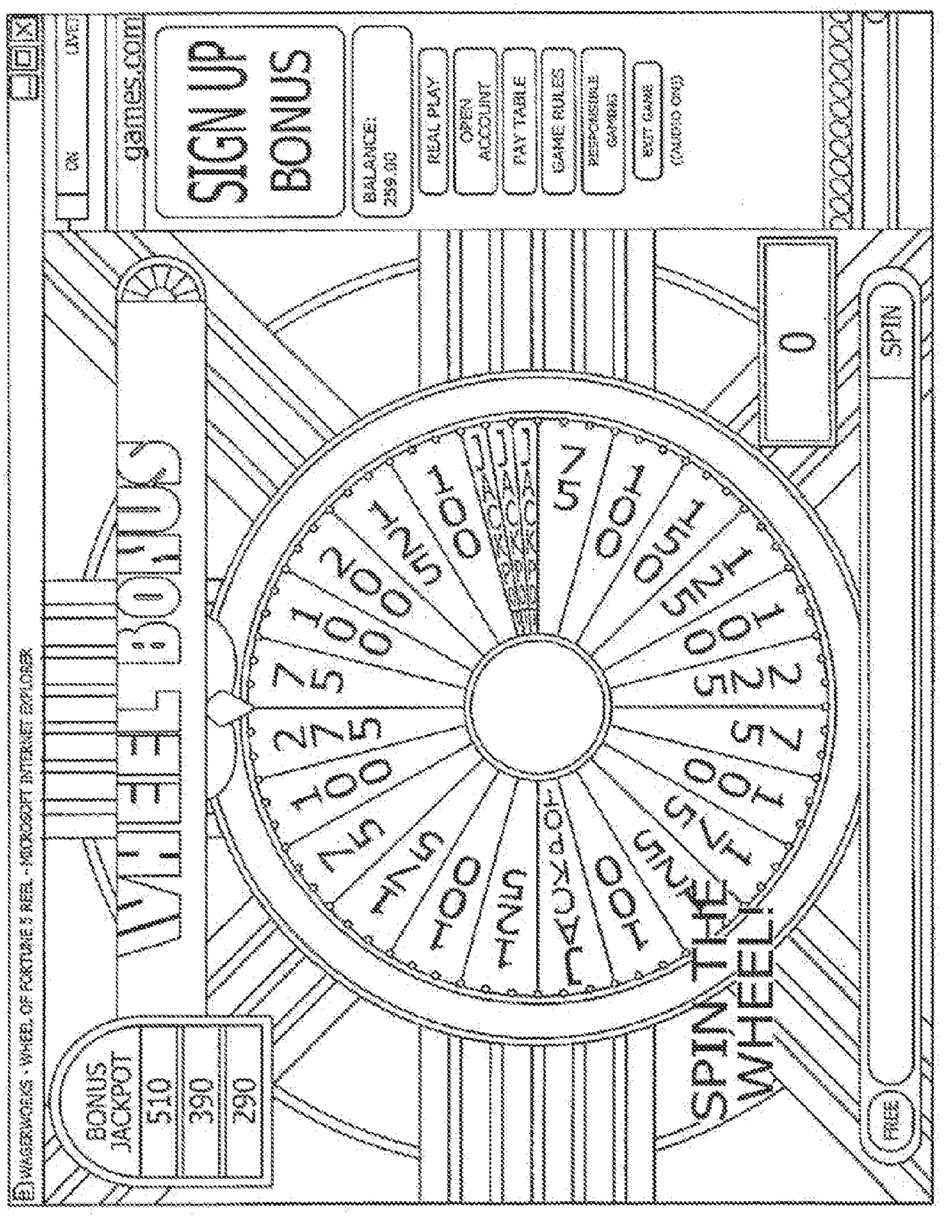
FIG. 12: Screen shot of exemplary game with said screen displaying a start of a bonus game w/pay line wager of 5 units causing one time awards boost.

FIG. 12 shows another screen shot. A primary game has triggered a bonus event with a wager of 5 units on the pay line which activated the bonus. The progressive award values, which were 110 units, 90 units and 90 units, respectively, prior to the start of the bonus round have been boosted. At the start of the bonus round, the progressive award values 610-630 have been boosted to 510 units, 390 units and 290 units, which corresponds to a boost of 400 units, 300 units and 200 units, respectively, which is based on the fact that the activating wager was 5 units. Therefore, each boost was calculated as Activating Pay Line Wager-1 unit)*Seed, or (5−1)*Seed, or specifically, 4*100 units=400 units, 4*75=300 units and 4*50 units=200 units. The screen shot also indicates that the progressive awards can be won within this bonus round as noted by the color coded slices 700 on the bonus wheel labeled “Jackpot”.

Figure 13:
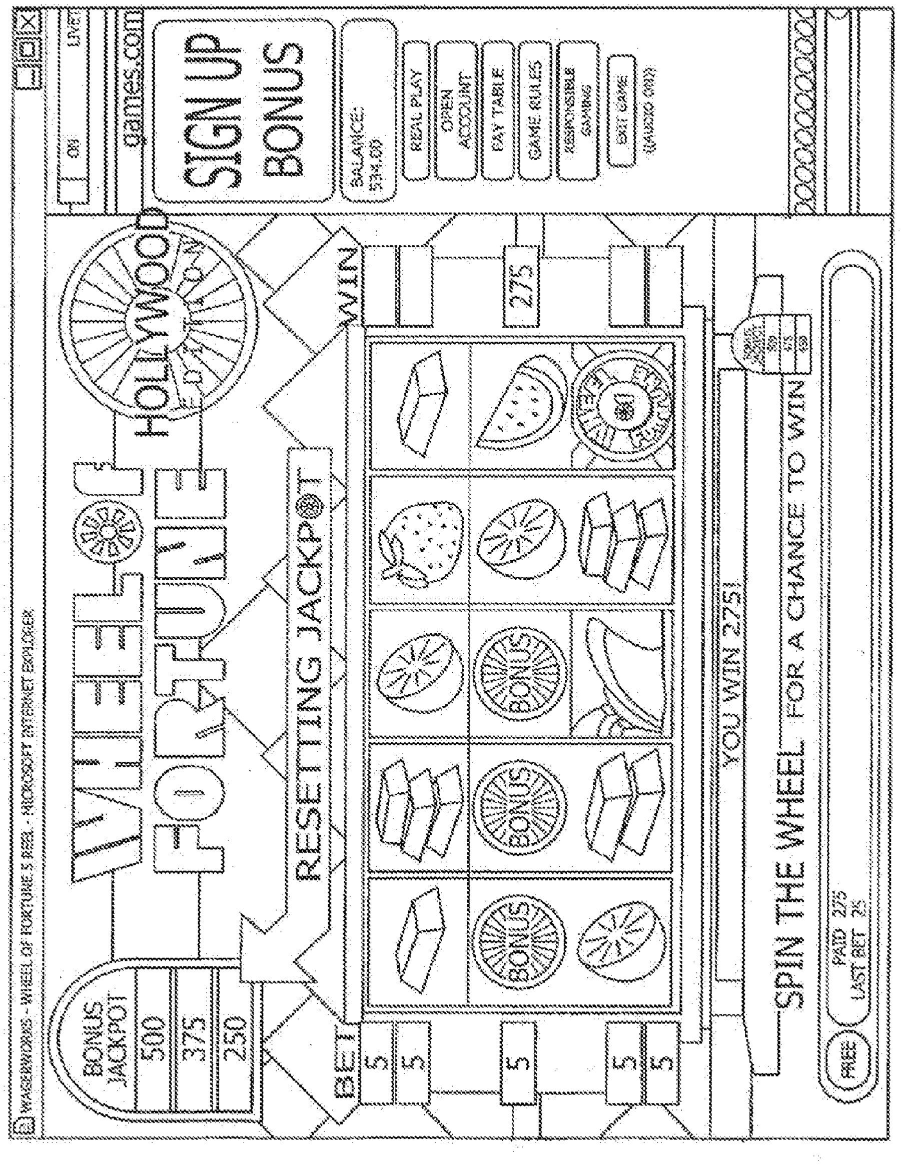
FIG. 13: Screen shot of exemplary game with said screen displaying reset pf awards after bonus game concludes.

FIG. 13 shows another screen shot. The screen shot shows the status if the game after the completion of the bonus round with a 5 unit activating pay line wager. The progressive award values are therefore set to values calculated as Activating Pay Line Wager*Seed or 5*Seed, or specifically, 5*100 units=500 units, 5*75 units=375 units and 5*50 units=250 units Although the invention has been described in detail with reference to several embodiments, additional variations and modifications exist within the scope and spirit of the invention as described and defined in the following claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with said at least one display device, and said at least one input device to:

(a) maintain a plurality of progressive awards, (b) display a plurality of reels, wherein each of the plurality of reels are separately associated with a different one of the maintained progressive awards, (c) enable a player to place a wager amount on a play of a game, and (d) for the wagered on play of the game:

(i) cause each of the plurality of reels to display one of a plurality of symbols, wherein the symbols displayed by the plurality of reels form a symbol combination, (ii) determine any awards associated with the formed symbol combination, (iii) display any determined awards associated with the formed symbol combination, and (iv) for each of the reels, if the symbol displayed by said reel is a designated symbol associated with said reel, increase the maintained progressive award associated with said reel.

2. The gaming system of claim 1, wherein a first one of the reels is associated with a first designated symbol and a second one of the reels is associated with a second, different designated symbol.

3. The gaming system of claim 2, wherein when executed by the at least one processor, the plurality of instructions cause the at least one processor to:

(i) increase a first one of the maintained progressive awards by a first amount if the first designated symbol is displayed by the first one of the reels, and (ii) increase a second, different one of the maintained progressive awards by a second, different amount if the second designated symbol is displayed by the second one of the reels.

4. The gaming system of claim 2, wherein when executed by the at least one processor, the plurality of instructions cause the at least one processor to:

(i) increase a first one of the maintained progressive awards by a first amount if the first designated symbol is displayed by the first one of the reels, and (ii) increase a second, different one of the maintained progressive awards by the first amount if the second designated symbol is displayed by the second one of the reels.

5. The gaming system of claim 1, wherein when executed by the at least one processor, the plurality of instructions cause the at least one processor to, for at least one of the reels, if the symbol displayed by said reel is one of a plurality of designated symbols associated with said reel, increase the maintained progressive award associated with said reel.

6. The gaming system of claim 5, wherein when executed by the at least one processor, the plurality of instructions cause the at least one processor to:

(i) increase the maintained progressive award associated with said reel by a first amount if a first one of the plurality of designated symbols associated with said reel is displayed by said reel, and (ii) increase the maintained progressive award associated with said reel by a second, different amount if a second, different one of the plurality of designated symbols associated with said reel is displayed by said reel.

7. The gaming system of claim 1, wherein for at least one of the reels, an amount of any increase of the maintained progressive award associated with said reel is based, at least in part, on the wager amount.

8. The gaming system of claim 1, wherein at least one of: the wager amount, any awards associated with any formed symbol combinations, any of the progressive awards are at least one selected from the group consisting of: a quantity of monetary credits, a quantity of non-monetary credits, and a quantity of player tracking points.

9. A method of operating a gaming system, said method comprising:

(a) causing at least one processor to execute a plurality of instructions to maintain a plurality of progressive awards, (b) causing at least one display device to display a plurality of reels, wherein each of the plurality of reels are separately associated with a different one of the maintained progressive awards, (c) enabling a player to place a wager amount on a play of a game, and (d) for the wagered on play of the game:

(i) causing each of the plurality of reels to display one of a plurality of symbols, wherein the symbols displayed by the plurality of reels form a symbol combination, (ii) causing the at least one processor to execute the plurality of instructions to determine any awards associated with the formed symbol combination, (iii) causing the at least one display device to display any determined awards associated with the formed symbol combination, and (iv) for each of the reels, if the symbol displayed by said reel is a designated symbol associated with said reel, causing the at least one processor to execute the plurality of instructions to increase the maintained progressive award associated with said reel.

10. The method of claim 9, wherein a first one of the reels is associated with a first designated symbol and a second one of the reels is associated with a second, different designated symbol.

11. The method of claim 10, which includes:

(i) causing the at least one processor to execute the plurality of instructions to increase a first one of the maintained progressive awards by a first amount if the first designated symbol is displayed by the first one of the reels, and (ii) causing the at least one processor to execute the plurality of instructions to increase a second, different one of the maintained progressive awards by a second, different amount if the second designated symbol is displayed by the second one of the reels.

12. The method of claim 10, which includes:

(i) causing the at least one processor to execute the plurality of instructions to increase a first one of the maintained progressive awards by a first amount if the first designated symbol is displayed by the first one of the reels, and (ii) causing the at least one processor to execute the plurality of instructions to increase a second, different one of the maintained progressive awards by the first amount if the second designated symbol is displayed by the second one of the reels.

13. The method of claim 9, which includes, for at least one of the reels, if the symbol displayed by said reel is one of a plurality of designated symbols associated with said reel, causing the at least one processor to execute the plurality of instructions to increase the maintained progressive award associated with said reel.

14. The method of claim 13, which includes:

(i) causing the at least one processor to execute the plurality of instructions to increase the maintained progressive award associated with said reel by a first amount if a first one of the plurality of designated symbols associated with said reel is displayed by said reel, and (ii) causing the at least one processor to execute the plurality of instructions to increase the maintained progressive award associated with said reel by a second, different amount if a second, different one of the plurality of designated symbols associated with said reel is displayed by said reel.

15. The method of claim 9, wherein for at least one of the reels, an amount of any increase of the maintained progressive award associated with said reel is based, at least in part, on the wager amount.

16. The method of claim 9, wherein at least one of: the wager amount, any awards associated with any formed symbol combinations, any of the progressive awards are at least one selected from the group consisting of: a quantity of monetary credits, a quantity of non-monetary credits, and a quantity of player tracking points.

17. The method of claim 9, which is provided through a data network.

18. The method of claim 17, wherein the data network is the internet.

19. A non-transitory computer readable medium including a plurality of instructions, which when executed by at least one processor, cause the at least one processor to:

(a) maintain a plurality of progressive awards, (b) cause at least one display device to display a plurality of reels, wherein each of the plurality of reels are separately associated with a different one of the maintained progressive awards, (c) enable a player to place a wager amount on a play of a game, and (d) for the wagered on play of the game:

(i) cause each of the plurality of reels to display one of a plurality of symbols, wherein the symbols displayed by the plurality of reels form a symbol combination, (ii) determine any awards associated with the formed symbol combination, (iii) cause the at least one display device to display any determined awards associated with the formed symbol combination, and (iv) for each of the reels, if the symbol displayed by said reel is a designated symbol associated with said reel, increase the maintained progressive award associated with said reel.

20. The non-transitory computer readable medium of claim 19, wherein a first one of the reels is associated with a first designated symbol and a second one of the reels is associated with a second, different designated symbol.

21. The non-transitory computer readable medium of claim 20, wherein when executed by the at least one processor, the plurality of instructions cause the at least one processor to:

(i) increase a first one of the maintained progressive awards by a first amount if the first designated symbol is displayed by the first one of the reels, and (ii) increase a second, different one of the maintained progressive awards by a second, different amount if the second designated symbol is displayed by the second one of the reels.

22. The non-transitory computer readable medium of claim 20, wherein when executed by the at least one processor, the plurality of instructions cause the at least one processor to:

(i) increase a first one of the maintained progressive awards by a first amount if the first designated symbol is displayed by the first one of the reels, and (ii) increase a second, different one of the maintained progressive awards by the first amount if the second designated symbol is displayed by the second one of the reels.

23. The non-transitory computer readable medium of claim 19, wherein when executed by the at least one processor, the plurality of instructions cause the at least one processor to, for at least one of the reels, if the symbol displayed by said reel is one of a plurality of designated symbols associated with said reel, increase the maintained progressive award associated with said reel.

24. The non-transitory computer readable medium of claim 23, wherein when executed by the at least one processor, the plurality of instructions cause the at least one processor to:

(i) increase the maintained progressive award associated with said reel by a first amount if a first one of the plurality of designated symbols associated with said reel is displayed by said reel, and (ii) increase the maintained progressive award associated with said reel by a second, different amount if a second, different one of the plurality of designated symbols associated with said reel is displayed by said reel.

25. The non-transitory computer readable medium of claim 19, wherein for at least one of the reels, an amount of any increase of the maintained progressive award associated with said reel is based, at least in part, on the wager amount.

26. The non-transitory computer readable medium of claim 19, wherein at least one of: the wager amount, any awards associated with any formed symbol combinations, any of the progressive awards are at least one selected from the group consisting of: a quantity of monetary credits, a quantity of non-monetary credits, and a quantity of player tracking points.

* * * * *

UNITED STATES PATENT AND TRADEMARK OFFICE

CERTIFICATE OF CORRECTION

PATENT NO. : 8,801,520 B2
APPLICATION NO. : 13/793746
DATED : August 12, 2014
INVENTOR(S) : Ernie M. Lafky et al.

It is certified that error appears in the above-identified patent and that said Letters Patent is hereby corrected as shown below:

IN THE CLAIMS

In Claim 1, Column 8, Line 47, delete “,”.
In Claim 8, Column 9, Line 49, between “,” and “any” insert --and--.
In Claim 16, Column 10, Line 62, between “,” and “any” insert --and--.
In Claim 18, Column 11, Line 2, replace “the” with --an--.
In Claim 26, Column 12, Line 34, between “,” and “any” insert --and--.

Signed and Sealed this
Sixth Day of October, 2015

Michelle K. Lee

Michelle K. Lee
*Director of the United States Patent and Trademark Office*